Feb. 10, 1942. R. L. WILSON Re. 22,026

CONTROL APPARATUS

Original Filed June 10, 1938 5 Sheets-Sheet 1

Inventor:
Roscoe L. Wilson
By: Belt, Wallace and Curtis
Attorneys

Feb. 10, 1942. R. L. WILSON Re. 22,026

CONTROL APPARATUS

Original Filed June 10, 1938 5 Sheets-Sheet 2

Inventor:
Rosser L. Wilson
By: Belt, Wallace and Cannon
Attorneys

CONTROL APPARATUS

Original Filed June 10, 1938 5 Sheets-Sheet 3

Inventor:
Roscoe L. Wilson
By: Belt, Wallace and Cannon
Attorneys

CONTROL APPARATUS

Original Filed June 10, 1938 5 Sheets-Sheet 4

Inventor:
Rosser L. Wilson
By: Belt, Wallace and Carrow
Attorneys

CONTROL APPARATUS
Original Filed June 10, 1938 5 Sheets-Sheet 5
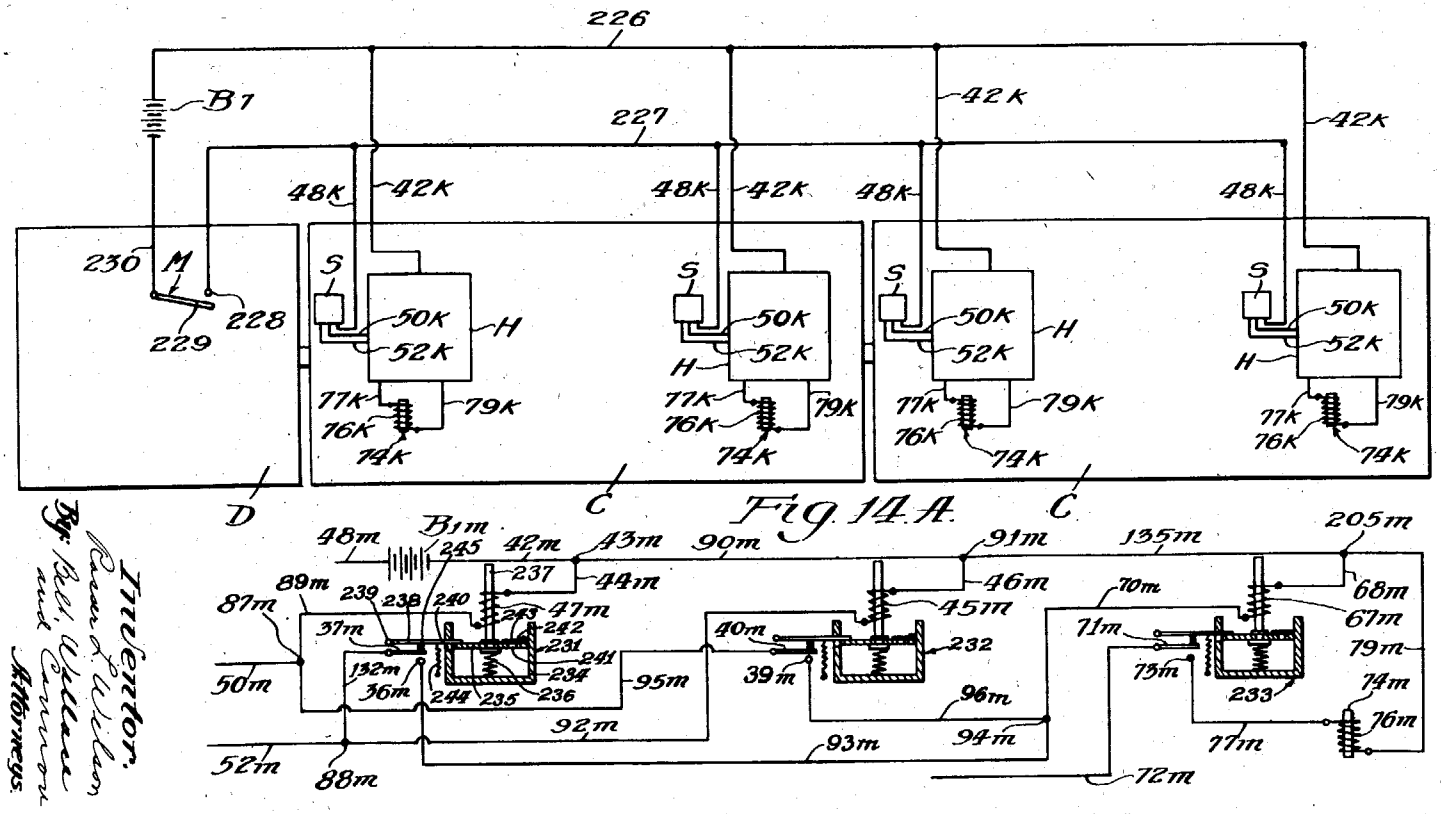

Reissued Feb. 10, 1942

Re. 22,026

UNITED STATES PATENT OFFICE 22,026

CONTROL APPARATUS

Rosser L. Wilson, Mahwah, N. J., assignor to The American Brake Shoe and Foundry Company, New York, N. Y., a corporation of Delaware Original No. 2,232,751, dated February 25, 1941, Serial No. 291,844, August 25, 1939, which is a division of Serial No. 213,103, June 10, 1938. Application for reissue August 5, 1941, Serial No. 405,568

36 Claims. (Cl. 175—355)

This application is a division of my copending application, Serial No. 213,103, filed June 10, 1938.

This invention relates generally to control apparatus, and more particularly it relates to such apparatus applied to at least two relatively movable elements to detect variation from a desired relative speed of such elements and to accomplish predetermined control operations in response to the detection of such undesired variation. An instance of two relatively movable elements where such undesired variation in relative speed may occur is found in railway and like equipment wherein the several wheels normally rotate substantially in unison, and wherein material variation from such rotative relation is indicative of an undesired sliding action or tendency toward such an action of one of the wheels.

In the normal operation of railway equipment it is believed that there is no slippage at the points of contact of the wheels of the equipment with the rails and that the wheels roll along the rails. During a braking operation on such equipment the retarding forces effective on the wheels react at the rails to slow down the rolling movement of the wheels and so long as the adhesion between each wheel and rail on which it rolls exceeds the retarding force effective on the wheel, the wheel is retarded without slippage at the contact thereof with the rail. It has been observed, however, where the retarding force in a braking operation exceeds the force of adhesion between a wheel and the rail on which it rolls, that the wheel slips on the rail and is thereafter retarded at a rate exceeding that at which it would have been retarded had not the slippage occurred and as a result the wheel comes to rest prematurely and thereafter slides along the rail.

There are many factors which may cause the retarding force effective on a wheel in a braking operation to exceed the adhesion between the wheel and the rail on which it rolls. For example, the braking means of railway equipment is so arranged that the friction between the elements thereof is less than what has come to be generally accepted as the usual value of the adhesion or friction between the wheel or wheels decelerated by operation of the braking means and the rail or rails on which such wheel or wheels rolls or roll. There may be, however, an unpredictable increase in the friction between the elements of the braking means or the friction between the wheel or wheels and rail or rails may unaccountably drop below what has come to be generally accepted as the value of such friction, and of course there may be a combination of such variations. If such variation occurs in a braking operation it is quite likely that the wheel or wheels affected thereby will slip on, rather than roll on, the rail or rails whereupon, as previously explained, the wheel or wheels may prematurely stop rolling and thereafter slide along the rail or rails. Such sliding of the wheels along the rails may impair the braking operation in which it occurs and may result in serious damage such as producing so-called flats on the wheels. It will be understood that wheel sliding may be occasioned in a wide variety of ways but that however occasioned it is objectionable.

It has been observed in braking operations on railway equipment that, when a wheel slips on the rail on which it normally rolls and prematurely stops rolling and thereupon slides along the rail, the wheel, in so far as its rotative movement is concerned, decelerates rapidly after the slippage occurs and quickly stops rolling to thereupon start to slide and also that where several wheels on different axles substantially simultaneously or simultaneously slip on the rail or rails on which they normally roll the wheels usually decelerate, in so far as rotative movement thereof is concerned, at different rates and consequently stop rolling and start to slide at different times. Such lack of uniformity in the slowing down of the wheels is probably due to variations in the conditions at the various wheels. These variations in the conditions may be due to differences in the loads on the various wheels on different axles, differences in the retarding forces affecting the respective wheels on different axles, or the like. In any event, however, where several wheels on different axles slip on the rail or rails, a variation in the rates of rotation of the various wheels usually arises before any wheel prematurely stops rolling and starts to slide along a rail.

An important object of the present invention is to detect undesired variation in the relative speed of two or more such relatively movable objects and, in response to such detection, to initiate a control operation such as an operation adapted to restore the desired speed relation.

It is recognized that the rates of movement of the various movable elements, such as the rates of rotation of the various wheels on a railway car or the like that are decelerated by independent braking means may not always be the same. For example, as applied to railway equipment, there may be a difference in the diameters of such wheels at the lines of contact thereof with the rail or rails which will of course cause the wheels to rotate at different rates in normal operation as well as during a braking operation. Thus elements operated at rates proportionate to the rates or rotation of wheels that are decelerated by independent braking means may not always operate at the same rate either in normal operation or during a braking operation. Where such elements are employed to effect a control operation, such as the release of the braking means when the elements operate at different rates during a braking operation, there may be instances where the elements will be operating at different rates even during a braking operation and yet there will be no need of effecting the control operation because there will not be present an abnormal condition which the control operation is to overcome.

Hence still another object of the present invention is to provide such an apparatus which operates only when the variation in the relative speeds of movement of the several elements exceeds a range predetermined to be indicative of an abnormal or undesired condition.

Since in many instances, as in the case of railway equipment, elements operated at rates proportionate to the rates of rotation of wheels as aforesaid may operate at different rates, as in the course of a braking operation, under conditions in which it will not be desirable to effect a control operation, such as the selective releasing of the independent braking means operative to decelerate the respective wheels or sets thereof, it is advantageous to interpose devices entailing a time factor in their operation intermediate the elements and the means under control thereof so that a time factor will enter into the determination of the existence of an abnormal condition and so to do constitutes still another object of the present invention.

More specifically, an object of this invention is to bring about successive or alternate periods of operation of slow-to-release relays and when the intervals between such period of operation are reduced in a predetermined amount to effect simultaneous operation instead of alternate operation, and an object ancillary to the foregoing is to render operative means under control of the relays only upon simultaneous operation of such slow-to-release relays.

Further objects are to employ elements, such as may be operated at rates proportionate to the rates of rotation of the wheels of railway or like equipment that are decelerated by independent braking means, to alternately render operative devices which may be brought into simultaneous operation and thereby bring about a control operation or the like and to maintain operative for a predetermined time whatever means are rendered effective to bring about the control operation whenever the interval intermediate alternate periods of operation of alternately operable devices is so reduced that the intermediate interval is eliminated; and to effect concurrent operation of normally alternately operable devices to bring about a control operation or the like and to maintain operative for a predetermined time whatever means are effective to bring about the control operation only under predetermined conditions.

In an arrangement where devices are alternately set in operation in such a way that under predetermined conditions the interval between the alternate operations is so reduced that the operations become simultaneous rather than alternate, it will be recognized that there will be instances where such simultaneous operation may be relatively brief. If such an arrangement is utilized to effect a control operation, such as the release of the braking means employed to decelerate a particular wheel or set of wheels of railway equipment, conditions might arise where the aforesaid relatively brief simultaneous operations in rather rapid succession might be caused to repeatedly occur for relatively short periods, and this would cause the control or other operation brought about by such simultaneous operations to be initiated and interrupted, successively, as where the control operation is the release of the braking means for railway equipment operative to slow down a particular wheel or set thereof, it might bring about alternate release and application of such braking means in rather rapid succession. Furthermore, conditions might arise where the aforesaid simultaneous operation might be brief but should nevertheless effect a relatively prolonged control operation such as relatively prolonged release of the braking means.

Hence, still another object of the present invention is to associate with alternately operable devices, which may be brought into simultaneous operation, an arrangement whereby the simultaneous operation of the devices will be caused to effect a predetermined operation even though the simultaneous operation may be relatively brief, and an object ancillary to the foregoing is to employ timed apparatus in association with alternately operable devices that may be brought into simultaneous operations so that upon simultaneous operation of the devices a predetermined operation may be effected for at least a predetermined time even though a period of simultaneous operation of the normally alternately operative devices may be relatively brief.

In many instances the performance of a control operation tends to reduce the safety factor normally present in the equipment to which it is applied, as in the case of railway equipment where the control operation releases or reduces the effectiveness of the braking means as aforesaid, and in instances of this character it is an object of the invention to provide a detecting and controlling apparatus wherein the control operation is limited to a definite period of time.

A further object is to provide a detecting and controlling apparatus of this character which may be rendered inoperative manually at any time so as to return the equipment with which it is associated to its normal effectiveness.

While in the foregoing discussion and in the following detailed description I refer to controlling the braking means of railway equipment, it is to be understood that my invention is not limited to control of the braking means of railway equipment for it can be employed to control braking means of other equipment on which slippage of a wheel thereof on the surface on which it normally rolls may occur, and furthermore the fundamentals underlying this invention may be employed to control a wide variety of operations in addition to braking operations. While the invention will be described herein with particular reference to railway equipment, it is capable of still wider application; and may be conveniently and advantageously employed, for example, to maintain a timed relation in the operation of screw propellers on ships, propeller shafts in aircraft applications, machine tool spindles, electrical generator sets, motors used in photographic transmission, conveyor feeds, and in numerous other instances where moving parts of machinery are correlated. It is therefore to be understood that the foregoing discussion and following detailed description pertain to preferred embodiments of my invention and hence such discussion and description are not to be taken as a limitation of the invention.

Selected embodiments of my novel invention are illustrated in the accompanying drawings wherein Fig. 1 is a diagrammatic view of one embodiment of my invention associated with a pair of wheels such as are provided at one side of a truck on railway equipment;

Fig. 14 is a diagrammatic view of an arrangement providing a common control for a plurality of control devices such as that to which this invention pertains; and Fig. 14A is a diagrammatic view of a yet further modified form of my invention.

Figure 1:
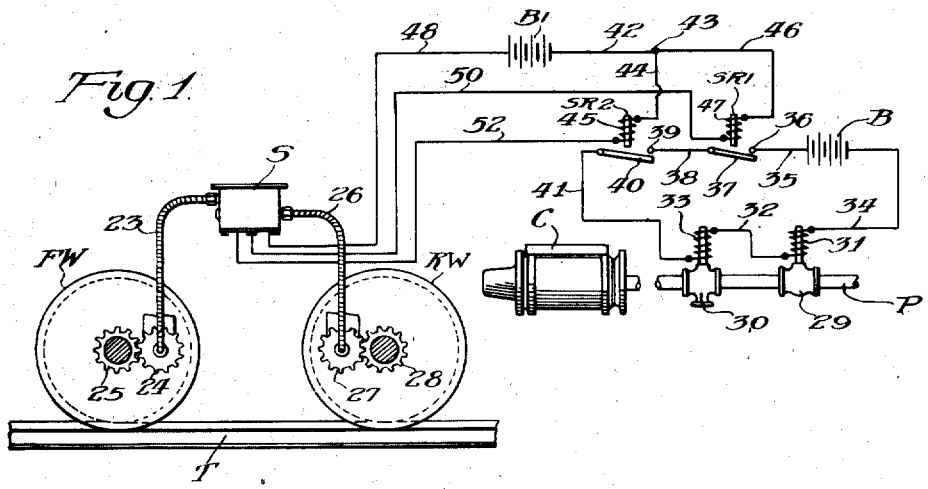

In the embodiment of my invention shown in Figs. 1 to 4, there is a switch S which includes a pair of rotors 15 and 16 respectively fast to shafts 17 and 18 journaled in suitable bearings in the switch housing 19. A gear 20 fast on the shaft 17 meshes with a gear 21 fast on the shaft 22 which is also journaled in suitable bearings in the housing 19, the gears 20 and 21 having a one-to-one ratio. The shaft 22 extends exteriorly of the housing 19 and one end of a flexible shaft 23 is connected to this end of this shaft, the other end of the flexible shaft being connected to a gear 24 that meshes with a gear 25 connected to a movable element such as the wheel FW for rotation therewith. In the present instance the gears 24 and 25 have a one-to-one ratio but this ratio may be varied as desired. Furthermore, the flexible shaft 23 could be connected to the wheel to derive motion therefrom in other ways, if so desired, as by being directly connected to the axle to which the wheel might be fast. The shaft 18 also extends exteriorly of the housing and one end of a flexible shaft 26 is connected to this end of this shaft, the other end of this flexible shaft being connected to a gear 27 that meshes with a gear 28 connected to a second relatively movable element such as the wheel RW for rotation therewith, this connection of the shaft 18 to the wheel RW being similar to connection of the shaft 17 to the wheel FW.

The wheels RW and FW as illustrated are to be mounted at one side of a truck (not shown) of railway equipment for movement along the rail T. These wheels are adapted to be slowed down by the usual brake apparatus (not shown) provided on railway equipment, which apparatus includes the brake cylinder C to which a fluid under pressure may be supplied through the pipe P. The brake apparatus is not illustrated inasmuch as the particular construction thereof forms no part of my invention which, in the illustrated forms, pertains to controlling the brake apparatus rather than to such apparatus per se. The relation of my invention to the brake apparatus is apparent from the illustration of my novel control means in association with the brake cylinder C to which fluid under pressure is supplied when the wheels FW and RW are to be slowed down.

In the present instance my novel apparatus is employed to control operation of a solenoid-operated check valve 29 and a solenoid-operated vent valve 30, each of which valves is positioned in the pipe P.

A conductor 32 connects one end of the winding 31 of the solenoid of the valve 29 to one end of the winding 33 of the solenoid of the valve 30. Another conductor 34 leads from the other end of the winding 31 to a source of current such as the battery B. Still another conductor 35 leads from this source of current to a contact 36 of the slow-to-release relay SR1, said contact 36 being engaged by the armature 37 of this relay during operation of the relay. A further conductor 38 leads from the armature 37 to a contact 39 of the slow-to-release relay SR2, this contact 39 being engaged by the armature 40 of the relay SR2 during operation of this relay. Yet another conductor 41 leads from the armature 40 to the end of the winding 33 opposite that to which the conductor 32 is connected. Hence, the windings 31 and 33, the armatures 37 and 40, and the contacts 36 and 39 are connected in series so that energization of the windings 31 and 33 is effected, to thereby operate the valves 29 and 30, only when both the armatures 37 and 40 are engaging the contacts 36 and 39, this occurring only when the relays SR1 and SR2 are operative simultaneously.

A conductor 42 leads from a source of current such as the battery B1 to a terminal 43. Another conductor 44 leads from the terminal 43 to one end of the winding 45 of the relay SR2 and a conductor 46 leads from the terminal 43 to one end of the winding 47 of the relay SR1. Still another conductor 48 leads from the source of current B1 to a terminal 49, Fig. 2, in the switch S. A further conductor 50 leads from the end of the winding 47 opposite that to which the conductor 46 is connected to a terminal 51 in the switch S. Yet another conductor 52 leads from the end of the winding 45 opposite that to which the conductor 44 is connected to a terminal 53 in the switch S.

A conductor ring 54 is mounted on the rotor 16 and a pair of conductor rings 55 and 56 are mounted in spaced relation on the rotor 15. The rotors 15 and 16 are preferably made of insulating material and hence the conductor rings 55 and 56 are insulated one from the other. A spring contact 57 mounted on the terminal 49 bears on the conductor ring 54 while spring contacts 58 and 59, respectively mounted on the terminals 51 and 53, respectively bear on the conductor rings 56 and 55. A pair of contact strips 60 and 61 are mounted in the periphery of the rotor 15 in diagrammatically opposite positions. These strips (see Fig. 3) each preferably extend over one-quarter of the periphery of the rotor so that the spacing between adjacent ends thereof is ninety degrees and the extent of each strip over the periphery of the rotor is ninety degrees. A conductor 62 (Fig. 4) interconnects the contact strip 60 with the conductor ring 56 while a conductor 63 connects the contact strip 61 with the conductor ring 55. A spring finger 64 is mounted in the rotor 16 in electrical connection with the conductor ring 54 and extends over that part of the periphery of the rotor 15 on which the contact strips 60 and 61 are provided so that if the rotors 15 and 16 move relative to each other the spring finger 64 alternatively engages the contact strips 60 and 61. Thus, these contact strips serve as a commutator while the spring finger 64 serves as a brush.

When the spring finger or brush 64 engages the contact strip 60, circuit is established from the source of current B1 through conductor 48, spring contact 57, conductor ring 54, brush 64, contact strip 60, conductor 62, conductor ring 56, spring contact 58, conductor 50, through winding 47 and conductors 46 and 42 back to the source of current B1 whereupon the slow-to-release relay SR1 is energized. When, however, brush 64 engages the contact strip 61 circuit is established from the source of current B1 through conductor 48, spring contact 57, conductor ring 54, brush 64, contact strip 61, conductor 63, conductor ring 55, spring contact 59, conductor 52, through winding 45 back to the source of current B1 through conductors 44 and 42 whereupon the slow-to-release relay SR2 is energized.

It will be noted that the rotor 15 is connected through shaft 17, gears 20 and 21, shaft 22, flexible shaft 23 and gears 24 and 25 to the wheel FW to rotate therewith and in the same direction and also that the rotor 16 is connected through shaft 18, flexible shaft 26 and gears 27 and 28 to the wheel RW to rotate therewith and in the same direction. Hence when the wheels FW and RW are rotating the rotors 15 and 16 rotate at rates proportionate to the rates of rotation of the respective wheels, and in the present instance, by reason of the one-to-one ratio between the gears of the various sets thereof, the rotors rotate at the same speed as the wheel to which each is respectively connected. It will be recognized, however, that the rotors could be caused to rotate at greater or less speeds or rates than the wheels, it only being important that the rates of rotation of the rotors be proportionate to the rates of rotation of the wheels.

When the rotors 15 and 16 both rotate at the same rate there is no relative movement therebetween and the brush 64 rests on one or the other of the contact strips 60 and 61 or in a space between adjacent ends of these strips, such spaces being of sufficient width and the brush being sufficiently narrow that the brush cannot engage both contact strips at the same time. Of course, whenever the brush 64 engages one or the other of the contact strips 60 or 61, either the slow-to-release relay SR1 or the slow-to-release relay SR2 is energized.

In the normal operation of railway equipment it is believed that there is no slippage at the points of contact of the wheels with the rails and the wheels roll along the rails. During a braking operation effective on the wheels of such equipment the retarding forces react at the rails to slow down the rolling movement of the wheels and so long as the adhesion between each wheel and the rail on which it rolls exceeds the retarding force effective on the wheel, the wheel is retarded without slippage at the contact thereof with the rail. However, when the retarding force in a braking operation exceeds the adhesion between a wheel and the rail on which it normally rolls, the wheel slips on the rail and is thereafter retarded at a rate exceeding that at which it would have been retarded had not the slippage occurred, and as a result the wheel comes to rest prematurely and thereafter slides along the rail.

Thus, where either the rotor 15 or 16 is connected to a wheel which is retarded in the manner just described and the other rotor is connected to a wheel which continues to roll on the rail, it is apparent that the rotor connected to the wheel which is so retarded will move relative to the other rotor in relatively rapid manner whereupon the contacts or brush 64 will engage the contact strips 60 and 61 in rapid succession. The rapidity with which the brush 64 so successively engages the contact strips 60 and 61 is directly proportionate to the magnitude of the difference in the rates of rotation of the wheels. The magnitude of such difference is relatively great when only one of the wheels slips on the rail while the other continues to roll on the rail. However, it has been observed, where several wheels slip on the rails at the same time, that the wheels do not slow down uniformly, this probably being due to varying conditions at the several wheels. Hence, where both the wheels to which the rotors 15 and 16 are respectively connected slip on the rail, it is very unlikely that they will slow down uniformly and hence even in this condition there will be relative movement between the rotors 15 and 16 and the brush 64 will successively engage the contact strips 60 and 61.

As explained heretofore, the contact strips 60 and 61 and the contacts or brush 64 are so arranged in circuit with the slow-to-release relays SR1 and SR2 that when the brush 64 engages the contact strip or conductor segment 60 the relay SR1 is energized, and when the brush 64 engages the strip 61 the relay SR2 is energized. Each of these relays is maintained energized so long as the brush 64 remains in engagement with the contact strip in circuit with the particular relay and when, for example, the relay SR1 is energized it attracts its armature 37 which thereupon engages the contact 36. Likewise when relay SR2 is energized it attracts its armature 40 which thereupon engages the contact 39. Furthermore, each of these relays, being a slow-to-release relay, remains operative after circuit thereto is broken, that is to say, for a predetermined time after circuit to the relay is broken its armature remains in engagement with the contact engaged by the armature upon energization of the relay, this being an inherent characteristic of a slow-to-release relay.

Hence, when the brush 64 successively engages the contact strips 60 and 61 in such a way that one contact strip is disengaged and the other strip is engaged and the relay in circuit with the second of the strips so engaged is energized in a period of time less than the predetermined time, the relay in circuit with the first of said strips remains operative after circuit thereto is broken, by disengagement of the brush 64 from the contact strip in circuit therewith, then both the relays SR1 and SR2 are simultaneously operative. When this occurs both the armatures 40 and 37 are engaged with their cooperating contacts 39 and 36 and circuit is closed through the windings 31 and 33 whereupon a control operation, such as release of the braking means effecting retardation or slowing down of the wheels, is effected, as will be more fully explained presently.

It is recognized that by reason of conditions encountered in the actual use of railway equipment there will be differences in the rates of rotation of wheels even when all the wheels are normally rolling along the rails. Such differences in rates of rotation may be due to differences in the diameters of the wheels at the lines of contact thereof with the rails. In fact there may be variations in the diameter of a single wheel at the line of contact thereof with the rail as the wheel rolls along the rail due to movement of the wheel in an axial direction. Since such conditions will exist, it is apparent that all differences in rates of rotation between wheels, to which rotors as 15 and 16 are respectively connected, should not cause these rotors to so rotate relative to each other that a control operation will be brought about. A control operation is not required unless an abnormal condition exists. To avoid a control operation unless an abnormal condition exists, provision is made to care for an extreme condition in actual operation, that is, a condition quite unlikely to be encountered, and the apparatus is so arranged that a control operation will not be effected under such extreme condition. In selecting such an extreme condition, one is chosen that will bracket other similar conditions and improper or undesired effecting of a control operation is therefore avoided.

An example of such an extreme condition is where railway equipment is operating at a speed of one hundred twenty miles per hour and the difference in diameters of the wheels to which the rotors 15 and 16 are connected is one inch at the lines of contact of such wheels with the rail or rails on which they normally roll as, for example, where the diameter of one wheel at the line of contact thereof with the rail is thirty-two inches and the diameter of the other wheel at the line of contact thereof with the rail is thirty-three inches. If a condition such as this prevailed the rotors 15 and 16 would rotate relative to each other even in normal operation and in the absence of slippage on the rail for there would be a difference in rotation therebetween of .634 revolution per second.

As explained above, each of the contact strips 60 and 61 extends over one-fourth of the diameter of the rotor 15 so that there is a ninety degree interval intermediate adjacent ends of the strips as well as a ninety degree extent of the strips. Thus, under the foregoing conditions where there is a difference of .634 revolution per second in the rotation of the rotors 15 and 16 it will require .394 second for the brush 64 to travel from the end of one contact strip 60 or 61 to the adjacent end of the other contact strip. Hence if the slow-to-release relays are timed to remain operative, after circuit thereto is broken, for less than .394 second, the armatures 37 and 44 will not be simultaneously engaged with their cooperating contacts 36 and 39 under the extreme condition mentioned above which is an operating speed of one hundred twenty miles per hour and a difference in the diameters of the wheels at the lines of contact with the rail of one inch.

It is, however, advantageous to afford a safety factor. Hence the slow-to-release relays may be timed to remain operative after circuit thereto is broken for approximately .242 second. In this circumstance, in order for the armatures 37 and 40 to be simultaneously engaged with their cooperating contacts it is necessary for there to be such relative rotation between the rotors 15 and 16 that the brush 64 will move from engagement with one of the contact strips 60 or 61 into engagement with the other of the contact strips in .242 second or less. It will be apparent that this is well beyond the time required for such successive engagement in the extreme condition described above which means that a control operation will not be brought about under normal operating conditions.

However, where slippage occurs between a wheel, to which one of the rotors 15 or 16 is connected, and the rail on which the wheel rolls, and the other wheel does not slip, or even if there is slippage between both wheels to which the rotors are respectively connected, and the rail or rails on which such wheels normally roll, there will be appreciable relative rotation between the rotors 15 and 16. Furthermore, once a wheel slips on the rail it thereafter, so far as its rotative movement is concerned, slows down rapidly and therefore almost or actually simultaneously with wheel slippage relative rotation between the rotors 15 and 16 is set up. Hence as soon as slippage occurs the brush 64 starts moving rapidly from engagement with one contact strip 60 or 61 into engagement with the other of the contact strips. Moreover, as soon as the time required for the brush 64 to move from one contact strip to the other is equal to or less than .242 second, both the armatures 37 and 40 will be engaged with their cooperating contacts 36 and 39 whereupon circuit will be closed to the windings 31 and 33 to effect a control operation. Since slippage causes relatively great relative rotation between the rotors 15 and 16, the brush 64 will move from one contact strip to the other in .242 second or less practically simultaneously with the initiation of wheel slippage.

While it is necessary that simultaneouse engagement of the armatures 37 and 40 with their cooperating contacts is to be avoided in normal operation, it is desirable to establish this simultaneous cooperation promptly under abnormal conditions, as when slippage occurs, and to illustrate the promptitude with which this would be brought about under abnormal conditions it is possible to effect simultaneous closing of the switches, of which the armatures 37 and 40 are a part, by only having slightly more than ninety degrees of relative rotation between the rotors 15 and 16 for the brush 64 may be near the end of one contact strip at the time rapid relative rotation between the rotors 15 and 16 is initiated and thus the brush need only move slightly more than ninety degrees to engage the other contact strip and effect simultaneous closing of the switches. It will be recognized that such movement may be effected very rapidly and from this it will be seen that the device is quite sensitive to abnormal differences in the rates of rotation between wheels as FW and RW.

To further explain the simultaneous closing of the switches, of which the armatures 37 and 40 are a part, when an abnormal condition arises as, for example, in event of wheel slippage in the course of a braking operation, if the relays SR1 and SR2 have a release time of approximately .242 second and the diameter of both the wheels FW and RW at the lines of contact thereof with the rails is approximately thirty-three inches, (in this circumstance there will be no relative rotation between the rotors 15 and 16 in normal operation) a difference in the rates of rotation of the wheels equivalent to approximately six miles per hour will cause the brush 64 to move from association with one contact strip 60 or 61 into engagement with the other contact strip in approximately .242 second and in proportionately less time as the difference in the rates of rotation increases.

Since it is probable that the rotors 15 and 16 will be rotating relative to each other even in normal operation, a further example of the operation of my novel apparatus, with particular reference to the extreme condition explained above, is now set forth. In such an extreme condition, entailing the connection of the rotors 15 and 16 respectively to wheels having an inch difference in diameter, that is, where one wheel is approximately thirty-two inches in diameter at the line of contact thereof with the rail and the other wheel is approximately thirty-three inches in diameter at the line of contact thereof with the rail, there will normally be, in the absence of wheel slippage on the rail, a difference of approximately .634 revolution per second in the rates of rotation of the wheels at one hundred twenty miles per hour. This is equivalent to a speed of approximately three and three-quarters miles per hour at the circumference of a thirty-three inch wheel. Now if, in such circumstances, the smaller wheel slips on the rail so as to alter the normal difference in the rates of rotation of the wheels, a difference in the rates of rotation between the wheels equivalent to approximately a speed of nine and three-quarters miles per hour at the circumference of a thirty-three inch wheel will cause the brush 64 to move from engagement with one contact strip 60 or 61 into engagement with the other contact strip in approximately .242 second and in proportionately less time as the difference in rates of rotation increases.

From the foregoing it will be apparent that wherever the difference in the rates of rotation between wheels as FW and RW is such that the brush 64 moves from engagement with one contact strip 60 or 61 into engagement with the other strip in less than .242 second, when the relays SR1 and SR2 have a release time of .242 second, then a control operation is initiated. In the present instance the control operation entails energization of the windings 31 and 33 with the result that the check valve 29 is closed and the vent valve 30 is opened. In the course of a braking operation fluid under pressure is supplied through the pipe P to the cylinder C so long as the check valve 29 is open. Thus when in the course of a braking operation the check valve 29 is closed and vent valve 30 is opened the cylinder C is disconnected from the source of fluid under pressure by the closing of the valve 29 and is vented to the atmosphere, in the present instance, by the opening of the valve 30, this venting resulting in reduction of pressure in the cylinder and effecting release of the braking means. Of course the arrangement could be such as to reduce the effectiveness of the braking means, rather than release thereof, if this were desired.

As soon as the braking means are released or reduced in effectiveness the retarding force effective on the wheels is removed or reduced, as the case may be, and thereupon the wheels tend to resume normal rolling along the rails. When the wheels resume normal rolling along the rails the difference in the rates of rotation therebetween become such that the brush 64 no longer moves from engagement with one of the contact strips 60 or 61 into engagement with the other of the contact strips in .242 second or less and therefore the switches of which the armatures 37 and 40 are a part do not remain closed with the result that circuit to the windings 31 and 33 is broken and thereupon the vent valve 30 closes and the check valve 29 opens. If the means operative to bring about the braking operation are still operating when this occurs, the braking means are again rendered effective and if the retarding forces do not again bring about a difference in the rates of rotation of the wheels there will not be such movement of the brush 64 from engagement with one contact strip 60 or 61 into engagement with the other contact strip that the windings 31 and 33 will be energized. If, however, re-application of the braking means again sets up a difference in the rates of rotation between the wheels as FW and RW such that the brush 64 moves from engagement with one of the contact strips 60 or 61 into engagement with the other strip in .242 second or less, the above described operation will be repeated.

It will be apparent from the foregoing that, since the slow-to-release relays SR1 and SR2 are simultaneously rendered operative by reason of a difference in the rates of rotation of wheels as FW and RW, a control operation can be initiated prior to the time one of the wheels prematurely stops rolling and therefore, where the control operation results in the release of the braking means, sliding of a wheel along a rail may be avoided for when the braking means are released (or reduced in effectiveness) the wheels, being freed of a retarding force, resume normal rolling along the rail.

In the form of my invention illustrated in Fig. 1 there may be such difference in the rates of rotation of wheels as FW and RW that the brush 64 will move from engagement with one contact strip 60 or 61 into engagement with the other contact strip in or less than .242 second to thereby render the relays SR1 and SR2 operative simultaneously but the difference in the rates of rotation may be such that the brush 64 will not be freed from the second of the contact strips so engaged and move back into engagement with the first of the contact strips so engaged in .242 second. In such an instance the first of the relays SR1 or SR2 to be energized might release prior to the time the brush engaged the contact strip in circuit with this particular relay and if this occurred circuit to the windings 31 and 33 would be broken. In a circumstance such as this a condition might arise where the difference in the rates of rotation of the rotors 15 and 16 would be such that the relays SR1 and SR2 might be rendered operative simultaneously as the brush moved from engagement with one of the contact strips 60 or 61 into engagement with the other of the contact strips but such simultaneous operativeness of the relays would not be maintained until the brush moved from the second of the strips so engaged back into engagement with the first of the strips so engaged. It will be apparent that if conditions such as this arose circuit would be alternately closed and opened through the windings 31 and 33 with the result that the valves 29 and 30 would both be rendered operative and then inoperative, alternately, which is to say, a control operation would be alternately initiated and interrupted.

Figure 5:
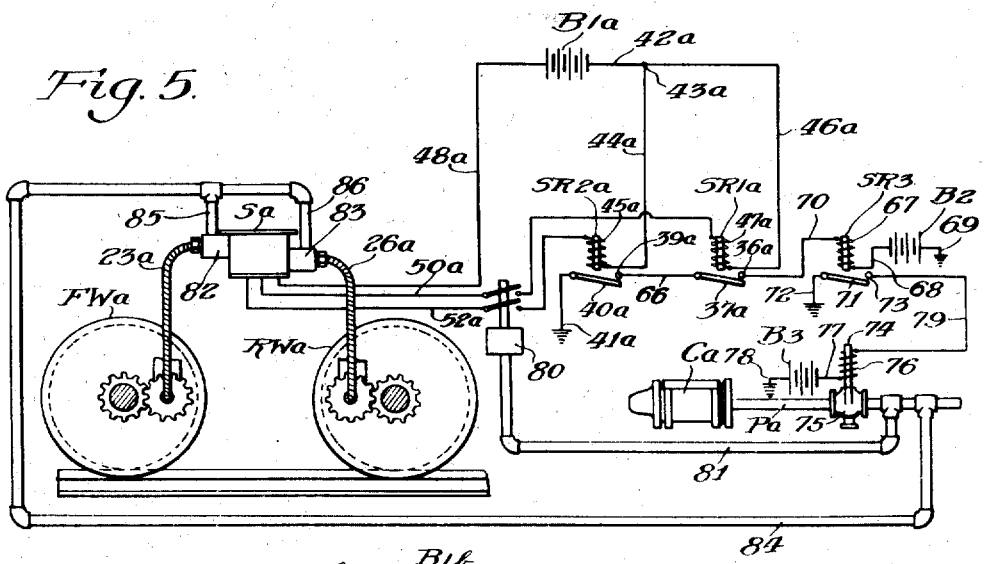
Fig. 5 is a view, similar to Fig. 1, showing another form of my invention.

In order to avoid such alternate initiation and interruption of a control operation my novel apparatus may be arranged in the manner illustrated in Fig. 5 wherein rotors similar to the rotors 15 and 16 in a switch S*a* are respectively connected to wheels FW*a* and RW*a* through flexible shafts 23*a* and 26*a*, the switch S*a* and the flexible shafts 23*a* and 26*a* being similar to the switch S and the flexible shafts 23 and 26 and being adapted for operation in a similar manner. Furthermore, slow-to-release relays SR1*a* and SR2*a*, similar to relays SR1 and SR2, are provided as well as a source of current as the battery B1*a*.

In this instance a conductor 42*a* leads from the source of current B1*a* to a terminal 43*a* and a conductor 44*a* leads from the terminal 43*a* to one end of the winding 45*a* of the slow-to-release relay SR2*a*. Another conductor 46*a* leads from the terminal 43*a* to one end of the winding 47*a* of the slow-to-release relay SR1*a*.

As in the case of the switch S, a brush in the switch S*a*, corresponding to the brush 64, is connected to the source of current B1*a* through a conductor 48*a* while a contact strip in the switch S*a*, corresponding to the contact strip 60 is connected to a conductor 50*a* which leads to the end of the winding 47*a* opposite to that to which the conductor 46*a* is connected. Further, a contact strip in the switch S*a*, corresponding to the contact strip 61 is connected to a conductor 52*a* which leads to the end of the winding 45*a* opposite that to which the conductor 44*a* is connected. (The switches shown in conductors 50*a* and 52*a* are explained hereinafter and for the purpose of the present description should be considered as being closed.

Slow-to-release relay SR2*a* includes an armature 40*a* and a contact 39*a* and the slow-to-release relay SR1*a* includes an armature 37*a* and a contact 36*a*. A conductor 66 interconnects a contact 39*a* and the armature 37*a*. The armature 40*a* is grounded as indicated at 41*a*.

In the form of the invention shown in Fig. 5 a third slow-to-release relay SR3 is provided which includes a winding 67, one end of which is connected to a source of current as the battery B2 through a conductor 68, said source of current being grounded at 69. The other end of said winding 67 is connected to the contact 36*a* through a conductor 70. The relay SR3 includes an armature 71 that is grounded as indicated at 72 and this relay also includes a contact 73 engageable by the armature 71 upon energization of the relay SR3.

A solenoid 74 is provided to control operation of the combined check and vent valve 75 provided in the pipe P*a* through which fluid under pressure is supplied to the brake cylinder C*a* which corresponds to the brake cylinder C. Upon energization of the solenoid 74 the valve 75 is operated to shut off supply of fluid under pressure to the brake cylinder C*a* and to vent said cylinder, the valve 75 therefore performing the function of the valves 29 and 30 shown in Fig. 1.

The solenoid 74 includes a winding 76, one end of which is connected through a conductor 77 to a source of current such as the battery B3 that is grounded as indicated at 78. A conductor 79 interconnects the other end of the winding 76 to the contact 73.

In the form of the invention shown in Fig. 5 when a brush in the switch S*a*, corresponding to the brush 64, rests on a contact strip in the switch S*a*, corresponding to the contact strip 60, circuit is closed from the source of current B1*a* through conductor 48*a* and through the switch S*a*, in the manner described in the description of the switch S, to a conductor 50*a* and through winding 47*a* and conductors 46*a* and 42*a* back to the source of current B1*a* whereupon the slow-to-release relay SR1*a* is energized. When, however, a brush in the switch S*a*, corresponding to the brush 64, engages a contact strip in the switch S*a*, corresponding to the contact strip 61, circuit is closed from the source of current B1*a* through conductor 48*a* and through the switch S*a*, in the manner described, to conductor 52*a* and through the winding 45*a* and conductors 44*a* and 42*a* back to the source of current B1*a* whereupon the slow-to-release relay SR2*a* is energized.

Energization of the relay SR1*a* attracts the armature 37*a* thereof which thereupon engages the contact 36*a*, this armature remaining in engagement with this contact after circuit to the winding 47*a* is broken for a predetermined time inasmuch as the relay SR1*a* is a slow-to-release relay. Thus the armature 37*a* engages the contact 36*a* so long as the relay SR1*a* is operative. Likewise energization of the slow-to-release relay SR2*a* attracts the armature 40*a* which thereupon engages the contact 39*a*, and this armature 40*a* remains in engagement with this contact after circuit to the winding 45*a* is broken for a predetermined period of time inasmuch as the relay SR2*a* is a slow-to-release relay. Hence the armature 40*a* remains in engagement with the contact 39*a* so long as the relay SR2*a* is operative.

It will be noted that engagement of the armature 37*a* with the contact 36*a* in the absence of the engagement of the armature 40*a* with the contact 39*a* does not close circuit from ground 41*a* through armature 40*a*, contact 39*a*, conductor 66, armature 37*a*, contact 36*a*, conductor 70, winding 67, conductor 68, battery B2 to ground 69 to effect energization of the slow-to-release relay SR3. Furthermore, the engagement of the contact 40*a* with the contact 39*a* in the absence of the engagement of the armature 37*a* with the contact 36*a* likewise does not close the just described circuit to effect energization of the slow-to-release relay SR3.

When, however, a brush in the switch S*a*, corresponding to the brush 64, moves from engagement with one of the contact strips in the switch S*a*, corresponding to the contact strips 60 and 61, and engages the other contact strip during the time the slow-to-release relay energized by the engagement of said brush with the first of said contact strips still have the armature thereof engaged with the cooperating contact and the relay energized by engagement of said brush with the second of the contact strips has attracted its armature into engagement with its cooperating contact, then the armature 40*a* will be engaging the contact 39*a* and the armature 37*a* will be engaging the contact 36*a* wherefore circuit to the winding 67 is closed and thereupon slow-to-release relay SR3 energizes.

The slow-to-release relay SR3 has a release time sufficiently prolonged that whenever this relay is energized it remains operative for a period sufficient to insure a control operation of not less than a predetermined period of time. Thus where, as in the present instance, the slow-to-release relay SR3 is arranged to control the supply of fluid under pressure to a brake cylinder as Ca, energization of this slow-to-release relay will initiate release of the braking means of which the cylinder Ca is a part (or will reduce the effectiveness of such braking means) and will maintain this braking means released (or reduced in effectiveness) for not less than a predetermined period of time irrespective of how long the armatures 37a and 40a remain in engagement with their co-operating contacts, this being due to the fact that energization of the slow-to-release relay SR3 initiates an operation which is not interrupted until release of the slow-to-release relay SR3. If the circuit is closed to the winding 67 of the relay SR3 for but a short time the operation under control of the relay SR3 will proceed for a period of time equal to the time of relatively brief energization of the winding 67 plus release time of the relay SR3, and since the energization will be relatively brief the control operation will proceed for substantially the period of time represented by the release time of the relay SR3. In any event, however, the control operation will proceed for a period of time equal to the period for which the winding 67 is energized plus the release time of the relay SR3.

Therefore by providing the relay SR3 with a release time sufficiently prolonged that a control operation of not less than a predetermined period will proceed each time the relay SR3 is energized it is possible to avoid objectionable alternate initiation and interruption of a control operation such as might result from the utilization of an arrangement such as shown in Fig. 1. Thus where the control operation is the release (or reduction in effectiveness) of the braking means of railway equipment, objectionable alternate release and application of the braking means will be avoided. Of course, even in this arrangement alternate release and application of the braking means might occur under a condition where the winding 67 was only momentarily energized and where, at the expiration of the release time of the relay SR3, both the armatures 37a and 40a would not be engaging their cooperating contacts, but wherein such engagement of the armatures would be effected shortly after release of the relay SR3 which would again result in energization of the relay SR3 and which would of course bring about another release of the braking means.

Release of the braking means by the arrangement illustrated in Fig. 5 is effected whenever the relay SR3 is operative for when this relay is operative the armature 71 thereof is engaged with the contact 73 whereupon circuit is closed from the ground at 72, through armature 71, contact 73, conductor 79, winding 76, conductor 77, battery B3 to ground at 78, which energizes the solenoid 74 and operates the valve 75 to close off the supply of fluid under pressure to the brake cylinder Ca and vent this cylinder to the atmosphere.

It has been explained heretofore that there may be relative movement between rotors as 15 and 16 even in normal operation of railway equipment and it has also been explained that whenever a brush such as the brush 64 is in engagement with a contact strip as the contact strips 60 and 61 the slow-to-release relay in circuit with the contact strip so engaged by the brush will be energized. However, where my novel apparatus is employed to prevent wheel sliding in the course of a braking operation by either releasing the braking means operative during such a braking operation or reducing the retarding forces established by operation of the braking means, the device may be arranged to prevent energization of the slow-to-release relays except during a braking operation by providing a control device such as the switch 80, Fig. 5. In the present instance the switch 80 is pressure-responsive and is connected to the pipe Pa through a pipe 81 ahead of the valve 75 so that so long as there is fluid under pressure in the pipe Pa (which condition will prevail so long as a braking operation is in progress) the switch 80 will be closed. The switch 80, as shown, may be conveniently arranged in the conductors 50a and 52a to thereby disconnect spring contacts as 58 and 59 from relays as SR1a and SR2a so long as the switch 80 was opened, which condition would prevail until fluid under pressure was supplied through the pipe Pa to the brake cylinder Ca during a braking operation. Hence, the relays as SR1a and SR2a could only be energized when a braking operation was in progress which, in the present arrangement, is the only time such relays need be energized.

There might also be conditions where it would be desirable to interrupt relative rotation between rotors as 15 and 16, except when these rotors were to be utilized to effect a control operation, as where the control operation brought about by predetermined operation of the rotors 15 and 16 relative to each other is the release of braking means or the reduction of the retarding force established by operation of such means, the rotors would be rendered operative only when a braking operation is in progress. To this end a fluid-responsive clutch 82 would be interposed between the flexible shaft as 23a and a shaft corresponding to the shaft 22, and another fluid-responsive clutch 83 would be interposed between the flexible shaft as 26a and the shaft as 18. A pipe as 84 connected to the pipe Pa ahead of the valve 75 leads to the clutch 82 through a branch pipe 85 and to the clutch 83 through a branch pipe 86 so that whenever fluid under pressure is supplied to the brake cylinder as Ca through a pipe as Pa the clutches 82 and 83 are engaged to thereby connect a rotor as 15 with a flexible shaft as 23a and a rotor as 16 with a flexible shaft as 26a.

As will be apparent to those skilled in the art, a switch such as the switch 80 may be employed with or without clutches as 82 and 83 and likewise clutches as 82 and 83 could be employed with or without a switch as 80, the use of these devices being dictated by the conditions under which my novel apparatus is used.

Figure 6:
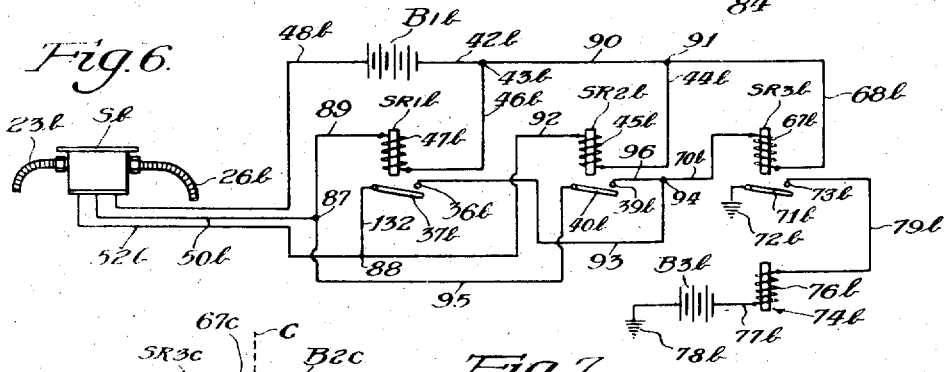
Fig. 6 is a diagrammatic view of a modification of the form of the invention shown in Fig. 5.

A further modified form of my invention is shown in Fig. 6 and herein a switch Sb is provided which is similar to the switch S and which includes rotors that in the present instance may be operated at rates proportionate to the rates of rotation of wheels of railway equipment through flexible shafts as 23b and 26b that correspond to the shafts 23 and 26.

A source of current B1b is provided and a conductor 48b leads from this source of current to a terminal in the switch Sb corresponding to the terminal 49 in the switch S. Conductors 50b and 52b respectively lead from terminals in the switch S*b* corresponding to the terminals 51 and 53 in the switch S. The conductor 50b leads to a terminal 87 while the conductor 52b leads to a terminal 88. Three slow-to-release relays SR1*b*, SR2*b* and SR3*b* are provided.

A conductor 42b leads from the source of current as the battery B1*b* to a terminal 43b and a conductor 46b leads from the terminal 43b to one end of the winding 47b of slow-to-release relay SR1*b*, a conductor 89 connecting the other end of this winding to the terminal 87. A conductor 90 leads from terminal 43b to a terminal 91 and a conductor 44b leads from the terminal 91 to one end of the winding 45b of the slow-to-release relay SR2*b*, a conductor 92 leading from the other end of this winding to the terminal 88. A conductor 132 interconnects the armature 37b with the terminal 88. A conductor 93 leads from the contact 36b to a terminal 94. A conductor 95 interconnects the armature 40b with the terminal 87 while a conductor 96 interconnects the contact 39b with the terminal 94. A conductor 70b leads from the terminal 94 to one end of the winding 67b of the slow-to-release relay SR3*b* and a conductor 68b leads from the other end of this winding to the terminal 91. The armature 71b of the relay SR3*b* is grounded as indicated at 72b while the contact 73b is connected through a conductor 79b to one end of the winding 76b of a solenoid 74b, the other end of this winding being connected through a conductor 77b to a source of current as the battery B3*b* which is grounded as at 78b.

So long as the slow-to-release relays SR1*b*, SR2*b* and SR3*b* are operative the armatures 37b, 40b and 71b are respectively engaged with the contacts 36b, 39b and 73b.

In the switch S*b* there is a brush similar to the brush 64 and contact strips similar to the contact strips 60 and 61. When this brush engages a contact strip similar to the contact strip 60 circuit is closed from the conductor 48b to the conductor 50b and when this brush engages a contact strip similar to the contact strip 61 circuit is closed from the conductor 48b to the conductor 52b.

When circuit is closed from the source of current as the battery B1*b* through conductor 48b, switch S*b*, conductor 50b to terminal 87, and through conductor 89, winding 47b and conductors 46b and 42b back to the source of current B1*b*, the slow-to-release relay SR1*b* is energized and the armature 37b thereof is engaged with the contact 36b. In normal operation this does not close circuit to the winding 67b since circuit to the conductor 52b is not closed at the same time circuit to the conductor 50b is closed and therefore the engagement of the armature 37b with the contact 36b does not close circuit from terminal 88 through conductor 132, armature 37b, contact 36b, conductor 93 to terminal 94. While closing of circuit to conductor 50b also closes circuit to conductor 95, circuit is not closed through armature 40b, contact 39b and conductor 96 to terminal 94 unless relay SR2*b* is operative to engage armature 40b with contact 39b.

When circuit is closed to conductor 52b, it is also closed to terminal 88 and in normal operation this does not close circuit through conductor 132, armature 37b, contact 36b and conductor 93 to terminal 94 for at this time armature 37b will be disengaged from contact 36b. However, closing of circuit to conductor 52b also closes circuit to conductor 92 and through winding 45b, conductors 44b, 90 and 42b, circuit is closed back to the source of current B1*b* whereupon the winding 45b of relay SR2*b* is energized and the armature 40b is engaged with the contact 39b.

In the operation of the device when the brush in the switch S*b* corresponding to the brush 64 in the switch S moves from engagement with one contact strip in the switch S*b*, similar to the contact strips 60 or 61, as the case may be, in a period of time such that the slow-to-release relay in circuit with the first of the so engaged strips is still operative at the time the brush engages the other of the contact strips, circuit will be closed to the terminal 94.

Thus, if the slow-to-release relay SR1*b* were the first of the two relays to be energized and is the one which remains operative, then the armature 37b thereof is engaging the contact 36b wherefore when the brush engages the one of the contact strips that closes circuit to conductor 52b, circuit will be closed from terminal 88 through conductor 132, armature 37b, contact 36b and conductor 93 to terminal 94. At this same time the winding 45b will be energized to engage the armature 40b with the contact 39b and if therefore the brush similar to the brush 64 moves from engagement with the second of the contact strips to be engaged into engagement with the first of the contact strips to be engaged prior to the time the relay SR2*b* releases, flow of current to the terminal 94 will be established from terminal 87, through conductor 95, armature 40b, contact 39b and conductor 96.

In either event it will be noted that when both the slow-to-release relays SR1*b* and SR2*b* are operative circuit is closed to the terminal 94 from the source of current B1*b* through conductor 48b and switch S*b* and either through conductor 50b, terminal 87, conductor 95, armature 40b, contact 39b and conductor 96 or through conductor 52b, terminal 88, conductor 132, armature 37b, contact 36b and conductor 93. From terminal 94 circuit is closed through conductor 70b, winding 67b and conductors 68b, 90 and 42b back to the source of current B1*b* whereupon the slow-to-release relay SR3*b* is rendered operative to attract its armature 71b into engagement with the contact 73b whereupon circuit is closed through the winding 76b of the solenoid 74b from ground at 72b through armature 71b, contact 73b, conductor 79b, winding 76b and conductor 77b to the source of current as the battery B3*b* and to ground at 78b. This energizes the winding of the solenoid 74b which may be arranged to operate a combined vent and check valve similar to the combined vent and check valve 75, Fig. 5, and thereafter a control operation will proceed in the manner described in connection with the description of Fig. 5.

The arrangement shown in Fig. 6 is quite similar to that shown in Fig. 5 but has an advantage over the arrangement shown in Fig. 5 in that the relay SR3*b* starts to energize as soon as a brush similar to the brush 64 engages a second contact strip, while the slow-to-release relay energized by engagement of the brush with the first of the strips is still operative, whereas in the arrangement shown in Fig. 5 it is necessary that the relay in circuit with the second of the strips so engaged be energized before circuit to slow-to-release relay SR3 is closed. In other respects the arrangements shown in Figs. 5 and 6 operate in an identical manner.

Figure 7:
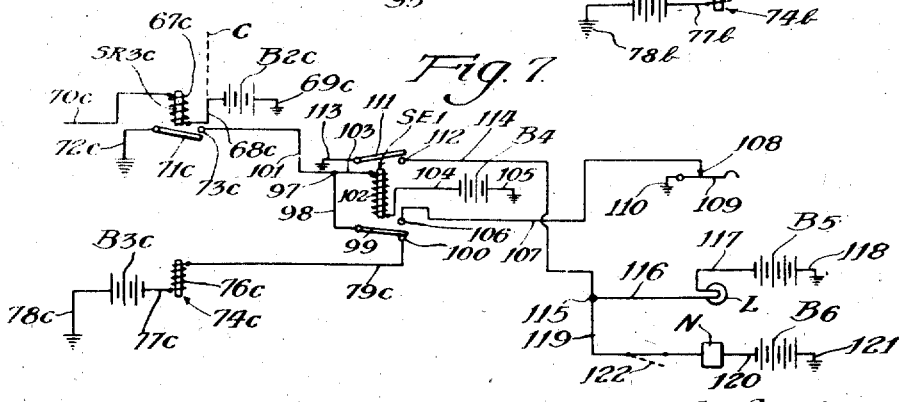
Fig. 7 is a diagrammatic view of a still further modified form of the invention shown in Fig. 5.

The form of my invention shown in Fig. 7 may be used either with the arrangement shown in Fig. 5 or the arrangement shown in Fig. 6. If used with the arrangement shown in Fig. 5, the conductor 70c, Fig. 7, would lead from a contact corresponding to the contact 36a to winding 67c and through conductor 68c and battery B2c to ground at 69c. If used with the arrangement shown in Fig. 6, the conductor 70c would lead from a terminal corresponding to the terminal 94, Fig. 6, through winding 67c, conductor 68c and the conductor shown in broken lines and indicated by c in Fig. 7 to a terminal corresponding to the terminal 91 and in this instance conductor 68c would not be connected to a source of current as B2c as shown in full lines in Fig. 7. Thus in the arrangement shown in Fig. 7 the slow-to-release relay SR3b is energized whenever an abnormal condition exists and the energization of this relay engages the armature 71c with the contact 73c to ground the conductor 101.

In the present instance the conductor 101 leads to a terminal 97 and when conductor 101 is grounded circuit is closed through a conductor 98, armature 99, contact 100, conductor 79c, winding 76c, conductor 77c, through the source of current B3c to ground at 78c. The winding 76c is part of a solenoid 74c which corresponds to, is for the same purpose as, and operates in the same manner as the solenoids 74 and 74b.

If in the operation of the arrangement shown in Fig. 7 the solenoid 74c is maintained operative for more than a predetermined period of time, then circuit thereto is broken. The predetermined period of time for which the solenoid 74c may continue to be operative will be of sufficient length to enable an intended control operation to be completed. Such a control operation, as explained above, may be release of braking means or a reductiton in the effectiveness of such means. When, however, operation of the solenoid 74c is not interrupted at the end of such predetermined period of time, the control operation should nevertheless be interrupted because this will be indicative of an inadvertent and improper condition. To this end a slow-to-energize relay SE1 is provided and the aforesaid armature 99 and contact 100 are a part of this relay.

The slow-to-energize relay SE1 includes a winding 102, one end of which is connected to the terminal 97 through a conductor 103, the other end of this winding being connected to a source of current as the battery B4 through a conductor 104, said battery being grounded at 105. The slow-to-energize relay SE1 is such that the armature 99 thereof is not attracted from engagement with the contact 100 into engagement with the contact 106 until a predetermined time after circuit to the winding 102 of this relay has been closed by the engagement of armature 71c with contact 73c.

Thus when the armature 71c is engaged with the contact 73c to apply ground on the winding 76c and thereby render the solenoid 74c operative, circuit is also closed from ground at 72c through armature 71c, contact 73c, conductor 101, terminal 97 and thence through conductor 103, winding 102 and conductor 104 to battery B4 and ground at 105. This energizes winding 102 but the armature 99 of the relay SE1 is not attracted until circuit has been closed through the winding 102 for a predetermined time. When, however, circuit remains closed through the winding 102 for a predetermined period of time, the armature 99 is attracted from engagement with the contact 100 into engagement with the contact 106 and thereupon circuit is closed from ground at 105 through the source of current B4, conductor 104, winding 102, conductor 103, terminal 97, conductor 98, armature 99, contact 106, conductor 107 to fixed contact 108 and through movable contact 109 to ground at 110 whereby a stick or holding circuit is closed through winding 102 to maintain the relay SE1 energized.

Such disengagement of armature 99 from contact 100 breaks circuit to winding 76c wherefore the solenoid 74c is rendered inoperative. The solenoid 74c will remain inoperative and no further control operations will be effected until the stick circuit through winding 102 is broken. This stick circuit can only be broken by manually disengaging the movable contact 109 from the fixed contact 108 and this will not be done until the reason why circuit remained closed to the winding 76c for greater than a predetermined period of time has been ascertained. Thus by the arrangement shown in Fig. 7 my device may be rendered inoperative until manually rendered operative and this will occur whenever a control operation is prolonged for greater than a predetermined period of time.

Obviously it will be advantageous to indicate the disengagement of the armature 99 from the contact 100 and the engagement thereof with the contact 106. Hence the slow-to-release energize relay SE1 is provided with another armature 111 that is adapted to engage the contact 112 simultaneously with the engagement of the armature 99 with the contact 106. The armature 111 is grounded as indicated at 113 and a conductor 114 leads from the contact 112 to a terminal 115. Thus circuit is closed to terminal 115 each time a stick circuit is closed for relay SE1.

A circuit from ground is closed from the terminal 115 through conductor 116, a visible signal such as the lamp L and conductor 117 to a source of current as the battery B5 each time terminal 115 is grounded by the engagement of armature 111 with contact 112, said source of current B5 being grounded at 118. A conductor 119 leads from the terminal 115 to an audible signal such as the buzzer N which is connected to a source of current as the battery B6 through a conductor 120, said battery being grounded as indicated at 121. Thus the buzzer N is rendered operative each time terminal 115 is grounded.

Thus the visible signal L and the audible signal N are rendered operative whenever the solenoid 74c is rendered inoperative by the disengagement of the armature 99 from the contact 100. While it may be advantageous to maintain both the audible signal N and the visible signal L operative once circuit thereto is closed, there may be circumstances where it will be desirable to interrupt circuit to one or the other or both of these signals and to this end a manually operable switch may be provided for this purpose, such a switch being indicated at 122 and being provided in the conductor 119 to enable the audible signal N to be rendered inoperative by the manual opening of this switch. Of course, a similar switch could be provided in the conductor 116 to render the visible signal L inoperative or such a switch could be provided in the conductor 114 so that both of the signals could be rendered inoperative if desired.

Figure 8:
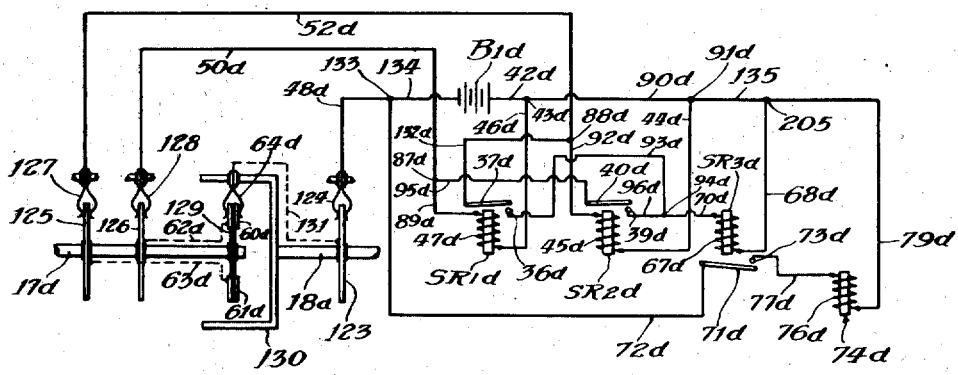
Figs. 8 and 9 are diagrammatic views of other forms of my invention.

The arrangement shown in Fig. 8 is similar to that shown in Fig. 6 except that the arrangement shown in Fig. 8 enables a single source of current to be utilized and a different type of switch is employed.

The switch shown in Fig. 8 includes a shaft 18*d* suitably journaled in the switch housing (not shown) and this shaft is to be connected to a flexible shaft or the like corresponding to the flexible shaft 26. A shaft 17*d* is also provided and which is also to be journaled in suitable bearings in the switch housing and a flexible shaft similar to the flexible shaft 23 is to be connected thereto. The flexible shafts used with the shafts 17*d* and 18*d*, Fig. 8, are to be arranged, for example, to cause these shafts to rotate at rates proportionate to the rates of rotation of, and in the same direction as, different wheels of railway equipment or the like, although these shafts need not necessarily rotate in the same direction as the wheels.

In this switch a conductive disc 123 is mounted on the shaft 18*d* but insulated therefrom and stationary spring contacts 124 engage this disc. Conductive discs 125 and 126 are mounted on but insulated from the shaft 17*d*, and stationary contacts 127 and 128 respectively engage the discs 125 and 126. A plate 129 of insulating material is also fast on the shaft 17*d* and carries contact strips 60*d* and 61*d* spaced from each other and of an extent similar to the contact strips 60 and 61. A spring contact 64*d* is carried by the bracket 130, fast on the shaft 18*d*, and this spring contact is adapted to successively engage the strips 60*d* and 61*d* in a manner similar to that in which the brush 64 engages the contact strips 60 and 61. The spring contact 64*d* is connected to the disc 123 through a conductor 131. The contact strips 60*d* are connected to the disc 126 through a conductor 62*d* while the contact strips 61*d* are connected to the disc 125 through a conductor 63*d*.

In use the shafts 17*d* and 18*d* are operated at rates proportionate to the rates of rotation of different wheels on railway equipment or the like and so long as the relative rotation between these shafts is such that the spring contacts 64*d* do not disengage one of the contact strips 60*d* or 61*d* and engage the other of the contact strips in a time equal to or less than the release time of the slow-to-release relays SR1*d* and SR2*d*, the slow-to-release relays SR1*d* and SR2*d* are not operative simultaneously, wherefore circuit is not closed to the slow-to-release relay SR3*d*. When however, the spring contact 64*d* disengages one contact strip 60*d* or 61*d* and engages the other contact strip prior to the release of the slow-to-release relay energized by the engagement of the spring contact with the first of such strips, then circuit is closed to the slow-to-release relay SR3*d*.

Assuming that the spring contact 64*d* is engaging contact strip 60*d*, as shown in Fig. 8, then circuit is closed from the source of current B1*d* through conductor 134 to terminal 133 and from there through conductor 48*d* to spring contact 124 and thence through disc 123, conductor 131, spring contact 64*d*, contact strips 60*d*, conductor 62*d*, disc 126, spring contacts 128 and conductor 50*d* to terminal 87*d*. From terminal 87*d* circuit is closed through conductor 89*d*, winding 47*d* and conductors 46*d* and 42*d* back to the source of current B1*d* whereupon slow-to-release relay SR1*d* is rendered operative to engage the armature 37*d* thereof with contact 36*d*. This however does not close circuit to the winding 67*d* of slow-to-release relay SR3*d* since circuit to conductor 52*d* is not closed at this time. Circuit is also closed from terminal 87*d* through conductor 95*d* to armature 40*d* which however at this time is disengaged from contact 39*d* wherefore circuit is not closed to the winding 67*d*.

If, however, the spring contact 64*d* moves from engagement with the contact strip 60*d* into engagement with the contact strip 61*d* prior to the time slow-to-release relay SR1*d* has released its armature 37*d*, then circuit is closed from the source of current B1*d* through conductors 134 and 48*d*, spring contact 124, disc 123, conductor 131, spring contact 64*d*, contact strip 61*d*, conductor 63*d*, disc 125, spring contacts 127 and conductor 52*d* to terminal 88*d*. From terminal 88*d* circuit is closed through conductor 132*d*, armature 37*d*, contact 36*d*, conductor 93*d* to terminal 94*d*. Circuit is also closed at this time from terminal 88*d* through conductor 92*d*, winding 45*d* and conductors 44*d*, 90*d* and 42*d* back to the source of current B1*d* wherefore the winding 45*d* of relay SR2*d* is energized. If, therefore, the spring contact 64*d* moves from engagement with the contact strip 61*d* into engagement with the contact strip 60*d* prior to the time relay SR2*d* has released its armature 40*d*, circuit will be closed from terminal 87*d* (to which circuit will be closed in the manner above described) through conductor 95*d*, armature 40*d*, contact 39*d* and conductor 96*d* to terminal 94*d*.

In either event when circuit is closed to terminal 94*d*, winding 67*d* is energized, current flowing from terminal 94*d*, through conductor 70*d*, winding 67*d* and conductors 68*d*, 135, 90*d* and 42*d* back to the source of current B1*d* whereupon slow-to-release relay SR3*d* is energized.

Slow-to-release relay SR3*d* is similar to and operates in the same manner as slow-to-release relay SR3 and when energized attracts its armature 71*d* into engagement with contact 73*d* whereupon circuit is closed from the course of current B1*d* through conductor 134, terminal 133, conductor 72*d*, armature 71*d*, contact 73*d*, conductor 77*d*, winding 76*d* and conductors 79*d*, 135, 80*d* and 42*d* back to the source of current B1*d*. This renders solenoid 74*d* operative and this solenoid operates in the manner above described with reference to solenoid 74 to operate a valve similar to the valve 75 for the purpose and in the manner above described.

Figure 10:
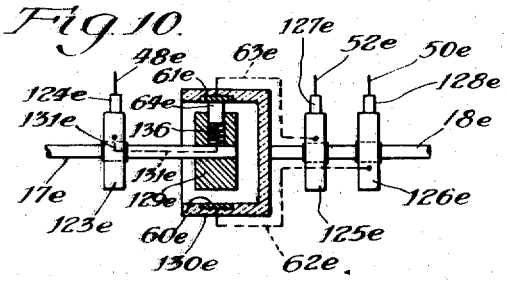
Fig. 10 is a diagrammatic view, partly in elevation and partly in section, of a modified form of switch that may be employed.

A modification of the form of the invention shown in Fig. 8 is illustrated in Fig. 10, the difference between Figs. 8 and 10 residing in the form of switch employed.

In the form of the invention shown in Fig. 10 shafts 17*e* and 18*e* are suitably journaled in bearings in the switch housing (not shown) and flexible shafts, corresponding to the flexible shafts 23 and 26, are connected to the shafts 17*e* and 18*e* so that they may be rotated at rates proportionate to the rates of rotation of, and in the same direction as, the wheels of railway equipment or the like although, here again, the shafts need not rotate in the same direction as the wheels. The shaft 18*e* however carries a substantially cup-shaped member 130*e* of insulating material and contact strips 60*e* and 61*e* are mounted on the inner periphery of the member 130*e*, said strips being of a length similar to and being spaced similarly to the contact strips 60 and 61 in the switch S. A conductor 63*e* connects the strip 61*e* with a disc 125*e*, similar to the disc 125 and on which the brush 127*e* bears. A conductor 62*e* interconnects the strip 60*e* with a disc 126*e*, similar to the disc 126 and on which the brush 128e bears. An annular body 129e, fast on the shaft 17e, is disposed within the substantially cup-shaped member 130e and carries a brush 64e that is urged outwardly by a spring 136 so that the brush will successively ride over the contact strips 60e and 61e upon relative rotation between the shafts 17e and 18e. A conductor 131e interconnects the brush 64e with the disc 123e similar to the disc 123, and on which the brush 124e bears.

The switch shown in Fig. 10 operates in a manner similar to that hereintofore described and could be used in place of any of the switches thus far described. If this were done, for example in so far as Fig. 8 is concerned, the conductor 48e would lead to a terminal similar to the terminal 133, Fig. 8, while the conductors 50e and 52e would respectively lead to terminals corresponding to the terminals 87d and 88d, Fig. 8. It is obvious that with the switch shown in Fig. 10 connected in this manner it would operate similarly to the switch shown in Fig. 8 to bring about a control operation in the above described manner.

Figure 11:
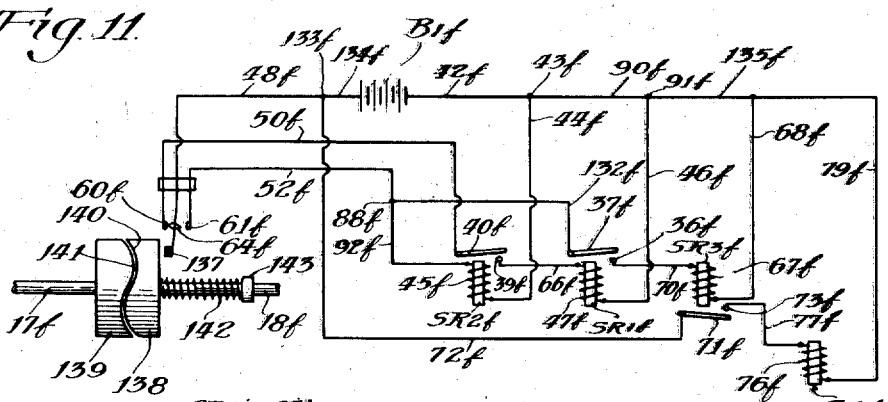
Figs. 11, 12 and 13 are still further diagrammatic views of still other forms of my invention.

A further modified form of my invention is shown in Fig. 11 and herein a somewhat different circuit and a somewhat different switch are illustrated. The circuit shown could be used with any of the switches thus far described and the switch shown herein could be used with any of the circuits thus far described. In the form of my invention shown in Fig. 11, shafts 17f and 18f are provided which in the manner previously described may be connected to the wheels of railway equipment to rotate at rates proportionate to the rates of rotation of such wheels and in the same direction, if desired.

A cam member 138 is slidably but non-rotatably mounted on the shaft 18f while a cam member 139 is fast on the shaft 17f. The cam members 138 and 139 have complementary cam surfaces 140 and 141 and a spring 142, disposed about the shaft 18f between the cam member 138 and the collar 143 fast on this shaft, urges the cam surfaces 140 and 141 into cooperating relation. When the cam surfaces are cooperating with each other in the manner shown in Fig. 11 the cam member 138 permits the rider 137 to assume the position shown wherein the contact 64f, controlled by the rider 137, engages the contact 60f. However, if the cam surfaces move relative to each other so that the high portions of the cam surface 140 are opposite the high portions of the cam surface 141, then the cam member 138 engages the rider 137 and moves the contact 64f from engagement with the contact 60f into engagement with the contact 61f.

Assuming that the shafts 17f and 18f have been rotating at substantially the same rate and that the cam surfaces 140 and 141 are cooperating with each other in the manner shown in Fig. 11, then the contact 64f engages the contact 60f and circuit is closed from the source of current B1f through conductor 134f, terminal 133f, conductor 48f, contact 64f, contact 60f, conductor 50f, to armature 40f which at this time will be disengaged from contact 39f and hence circuit is not closed in this instance to any of the slow-to-release relays SR1f, SR2f or SR3f.

When, however, the high portions of the cam surfaces 140 and 141 are cooperating with each other, circuit is closed from the source of current B1f through conductor 134f, terminal 133f, conductor 48f, contact 64f, contact 61f, conductor 52f to terminal 88f and from terminal 88f through conductor 92f and winding 45f, back through conductors 44f and 42f to the source of current B1f whereupon slow-to-release relay SR2f is energized and the armature 40f is engaged with the contact 39f. This however does not close circuit to the winding 47f if the high portions of the cam surfaces 140 and 141 are still opposite each other.

If, however, the relative rotation between the shafts 17f and 18f is such that immediately after the high portions of the cam surfaces 140 and 141 have been aligned with each other the cam surfaces move into relationship shown in Fig. 11, then the contact 64f engages the contact 60f and thereupon circuit is closed from the source of current B1f through conductor 134f, terminal 133f, conductor 48f, contact 64f, contact 60f, conductor 50f to armature 40f. If the contact 64f engaged the contact 60f prior to the time the slow-to-release relay SR2f has released the armature 40f from the contact 39f, then circuit is closed through conductor 66f, winding 47f, and conductors 46f, 90f and 42f back to the source of current B1f whereupon slow-to-release relay SR1f is energized and armature 37f thereof is engaged with contact 36f.

Hence if the relative rotation between the shafts 17f and 18f continues and the high portions of the cam surfaces 140 and 141 move into alignment with each other prior to the time the slow-to-release relay SR1f has released armature 37f from contact 36f, then circuit is closed to terminal 88f in the manner above described and from terminal 88f through conductor 132f, armature 37f, contact 36f, conductor 70f, winding 67f, and conductors 68f, 135f, 90f and 42f back to the source of current B1f whereupon slow-to-release relay SR3f energizes.

It will be apparent from the foregoing description that the arrangement shown in Fig. 11 requires the successive engagement of two slow-to-release relays in less time than the release times of such slow-to-release relays in order that the slow-to-release relay SR3f will be operative. Hence this arrangement requires that the need for a control operation be prevalent for a greater period of time than any heretofore described. When, however, the slow-to-release relay SR3f is energized it operates in a manner similar to that described with reference to the slow-to-release relay SR3, Fig. 5, and the solenoid 74f is rendered operative to operate a valve similar to the valve 75, Fig. 5, or to bring about any other desired control operation, circuit being closed to the winding 76f of the solenoid 74f so long as slow-to-release relay SR3f is operative from the source of current B1f through conductor 134f, terminal 133f, conductor 72f, armature 71f, contact 73f, conductor 77f, winding 76f and back through conductors 79f, 135f, 90f and 42f to the source of current B1f.

Figure 13:
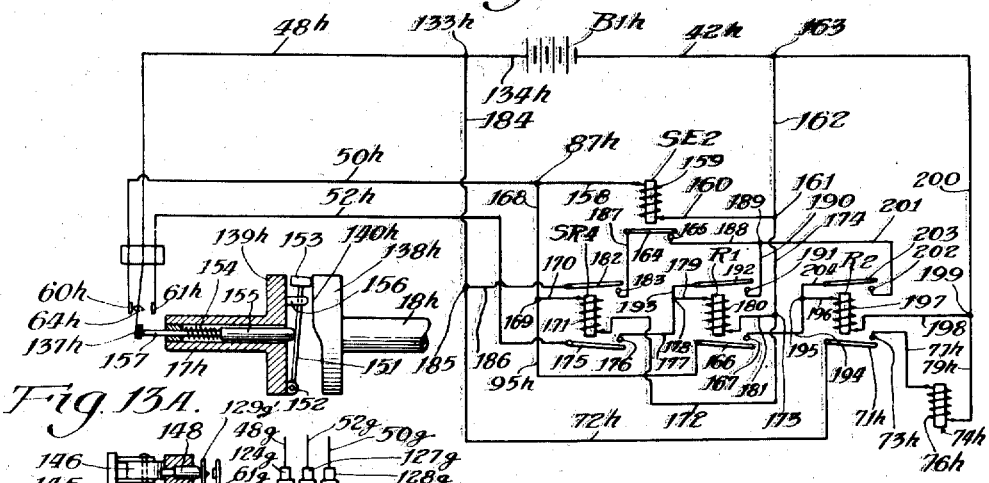
Figure 13A:
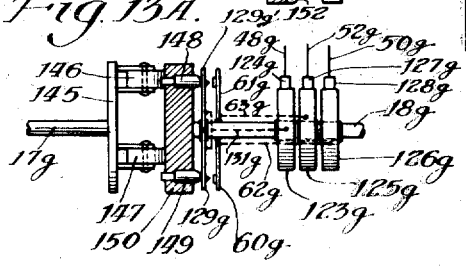
Fig. 13A is a diagrammatic view of still another form of switch that may be employed.

A still further modified form of switch is shown in Fig. 13A and herein shafts 17g and 18g are provided which are adapted to be operated at rates proportionate to the rates of rotation of wheels of railway equipment or other rotative devices to be controlled, and hence these shafts are similar to corresponding shafts previously described. Three discs 123g, 125g and 126g are mounted on the shaft 18g to rotate therewith but these discs are insulated from this shaft. Brushes 124g, 127g and 128g respectively bear on these discs and conductors 48g, 52g and 50g are respectively connected to these brushes. These conductors correspond to the conductors hereinabove described and numbered 48, 52 and 50, both with and without suffixes. Contact strips 60g and 61g are carried by the shaft 18g as are flexible plates 129g and 129g'. The contact strip 61g is connected to the disc 125g by a conductor 63g, the contact strip 60g is connected to the disc 126g by a conductor 62g, while the flexible plates 129g and 129g' are connected to the disc 123g by a conductor 131g. A plate 145 is fast on the shaft 17g and carries a pair of rollers 146 and 147, of which roller 146 is successively engageable with plungers 148 and 149 in the disc 150 that is fast on the shaft 18g. The roller 147 is a balance roller to avoid unnecessary vibration in the device.

When the shafts 17g and 18g rotate relative to each other the roller 146 so successively engages the plungers 148 and 149 and forces these plungers inwardly that first the flexible plate 129g is engaged with contact strip 60g and then the plate 129g' is engaged with the contact strip 61g. When this successive engagement of these flexible plates with the contact strips 60g and 61g is such that the engagement occurs at intervals of time equal to or less than the release time of slow-to-release relays in circuit with the conductors 52g and 50g, as above described in connection with conductors numbered 48, 52 and 50, both with and without suffixes, then operation of a solenoid such as the solenoid 74f (or the solenoids 31 and 33) is brought about for the purpose hereinabove described, for it will be recognized that the engagement of the flexible plate 129g with the contact strip 60g closes circuit from conductor 48g to conductor 50g while engagement of the flexible plate 129g' with the contact strip 61g closes circuit from conductor 48g to conductor 52g.

The arrangement shown in Fig. 13 differs from that hereinabove described inasmuch as only one slow-to-release relay is employed to determine whether or not a control operation is to be instituted. Furthermore, a somewhat different type of switch is illustrated in Fig. 13.

The switch shown in Fig. 13 includes shafts 17h and 18h similar to shafts 17 and 18 and which are operated similarly to said shafts 17 and 18. A cam member 138h is fast on the shaft 18h while a disc 139h is fast on the shaft 17h. The cam member 138h embodies a cam surface 140h including high and low portions. A rocker 151 is pivotally mounted at 152 on the disc 139h and includes a rider 153 that is urged into engagement with the cam surface 140h by the action of a spring 154 on a plunger 155, said spring and plunger being mounted in the shaft 17h as shown in Fig. 13. A guide 156 is mounted on the disc 139h to insure proper rotation of the rocker 151 with the disc 139h. The plunger 155 includes a stem 157 on which the rider 137h bears.

When the rider 153 rides on the high part of the cam surface 140h, the stem 157 acts on the rider 137h to hold the contact 64h in engagement with the contact 60h. When, however, the rider 153 moves onto a low part of the cam surface 140h, the stem 157 so cooperates with the rider 137h that the contact 64h engages the contact 61h.

In the switches shown in Figs. 11 and 13, the contacts 64f and 64h may remain in engagement with one or the other of their two cooperating contacts for relatively protracted periods in normal operation of the device but of course when there is relative rotation between the shafts and the members mounted on these shafts, the contacts 64f and 64h move from engagement with one cooperating contact into engagement with the other cooperating contact in a relatively rapid manner for when there is appreciable relative rotation between the shafts as 17f and 18f it is indicative, in the present instance, of a wheel sliding condition and therefore a control operation is to be initiated. Of course, due to sharpness of the inclination between the two different cam surface levels of a device shown in Fig. 13, the shift of contact 64h from either contact 60h or 61h to the other will occur more rapidly than in the arrangement shown in Fig. 11 for the same difference in the rates of rotation between the shafts. Furthermore, it is intended that by reason of such sharpness of inclination between the cam surfaces the contact 64h will move from either contact 60h or 61h to the other, or vice versa, in such time that there will be little if any interval between such engagements.

In normal operation so long as the contact 64h remains in engagement with the contact 60h circuit is closed from the source of battery B1h through conductor 134h, terminal 133h, conductor 48h, contact 64h, contact 60h, conductor 50h to terminal 87h. This closes circuit to conductor 158 and winding 159 of slow-to-energize relay SE2 for this complete circuit back to the battery B1h through conductor 160, terminal 161, conductor 162, terminal 163 and conductor 42h. Relay SE2 being a slow-to-energize relay may therefore energize in normal operation to attract its armature 164 from normal engagement with the contact 165 but this is without effect in normal operation. Furthermore, when circuit is closed to terminal 87h circuit is also closed to conductor 168 and terminal 169. From terminal 169 circuit is then closed through conductor 95h to armature 166 which remains disengaged from contact 167 until relay R1 is energized. Closing of circuit to terminal 169 closes circuit through conductor 170, winding 171 of slow-to-release relay SR4, conductor 172, terminal 173, conductor 174, terminal 161, conductor 162, terminal 163 and conductor 42h back to the source of current B1h. This energizes slow-to-release relay SR4 whereupon the armature 175 thereof is attracted into engagement with contact 176. In normal operation the engagement of armature 175 with contact 176 is without effect since circuit will not be closed from source of current B1h through conductor 134h, terminal 133h, conductor 48h, contact 64h, contact 61h and conductor 52h to armature 175 and hence relay R1 is not energized, assuming shafts 17h and 18h are rotating at equal rates.

It has been explained hereinabove that contact 64h is rapidly disengaged from contact 60h and is almost instantaneously moved into engagement with contact 61h whenever the rider 153 moves from the high portion of the cam surface 140h and onto the low portion thereof. It has also been stated that in normal operation there is apt to be a slight difference in the rates of rotation of the wheels to which the rotating elements as 138h and 139h of the switch assembly are respectively connected, due, for example, to a discrepancy in diameters of these wheels. Therefore, it may happen that in normal operation the contact 64h will become disengaged from contact 60h and will move into engagement with contact 61h before the slow-to-release relay SR4 has been deenergized by the separation of the contacts 60*h* and 64*h*. This will complete a circuit from source of current B1*h* through contacts 64*h* and 61*h* to armature 175, as just described, and thence through contact 176, conductor 177, terminal 178, conductor 179, winding 180 of relay R1, conductor 181, terminal 173, conductor 174, terminal 161, conductor 162, terminal 163, and conductor 42*h* back to the source of current B1*h*, whereupon relay R1 is energized.

The slow-to-release relay SR4 also includes an armature 182 which remains in engagement with the contact 183 so long as the armature 175 remains in engagement with the contact 176. Hence at the time circuit is closed through the winding 180 of relay R1, circuit is also closed from battery B1*h* through conductor 134*h*, terminal 133*h*, conductor 184, terminal 185, conductor 186, armature 182, contact 183, conductor 187, armature 164 and contact 165, inasmuch as slow-to-energize relay SE2 is not energized at this time, and through conductor 188 to terminal 189. Since at this time relay R1 is energized, circuit is now closed from terminal 189, through conductor 190, contact 191, armature 192 of relay R1 through conductor 193 to terminal 178 whereupon a stick or holding circuit for relay R1 is established.

As will be shown more fully hereinafter, the energization of relay R1 is without effect upon the remainder of the apparatus unless slow-to-release relay SR4 maintains its armatures 175 and 182 in engagement with their respective contacts 176 and 193 throughout the entire interval between two successive engagements of the contact 64*h* with contact 60*h*. During normal operation this interval is always greater than the deenergization time of the relay SR4, so that relay R1 will be deenergized, as a result of the disengagement of armatures 175 and 182 from their respective contacts upon deenergization of relay SR4, prior to the time contact 64*h* again engages contact 60*h*. Hence, during normal operation the armature 166 of relay R1 will be disengaged from its contact 167 at all times when contacts 60*h* and 64*h* are in engagement with each other, and therefore circuit is not completed beyond armature 166.

However, when an abnormal condition arises and the shafts 17*h* and 18*h* start to rotate relative to each other at such a rate that after the contact 64*h* has engaged the contact 61*h* and energized the relay R1 the contact 64*h* is caused to engage the contact 60*h* prior to the time the slow-to-release relay SR4 has released its armatures 175 and 182, then circuit is closed from conductor 168, terminal 169, conductor 95*h*, armature 166 of relay R1, which relay will be held energized by the above traced stick circuit, and contact 167, conductor 194, terminal 195, conductor 196, winding 197 of relay R2, conductor 198, terminal 199, conductor 200, terminal 163 and conductor 42*h* back to the battery B1, whereupon relay R2 is energized. Furthermore, circuit is closed from the source of current B1*h* through conductor 134*h*, terminal 133*h*, conductor 48*h*, contact 64*h*, contact 60*h*, and conductor 50*h* to terminal 87*h* to again initiate energization of slow-to-release relay SE2 through conductor 158 as above described.

The above described energization of relay R2 closes a stick or holding circuit therefor from terminal 189 through conductor 201, contact 202, armature 203 of relay R2 which will be engaged with contact 202, upon energization of said relay R2, and through conductor 204 to terminal 195. Hence, so long as slow-to-energize relay SE2 does not attract its armature 164 and so long as slow-to-release relay SR4 does not release its armature 182, the relays R1 and R2 will be held energized. However, upon the energization of slow-to-energize relay SE2 or the release of armature 182 of slow-to-release relay SR4, at the end of a period of operation of this relay, the stick circuits for the relays R1 and R2 are broken and thereupon these relays release.

So long as the relay R2 remains energized the armature 71*h* thereof is held in engagement with the contact 73*h* whereupon circuit is closed through conductor 77*h*, winding 76*h*, conductor 79*h*, terminal 199, conductor 200, terminal 163 and conductor 42*h* back to the source of current B1*h* wherefore the winding 76*h* is energized to render the solenoid 74*h* operative. Solenoid 74*h* is similar to solenoids heretofore described bearing this reference character with or without suffixes and therefore energization of the winding 76*h* brings about a control operation as above described.

Figure 9:
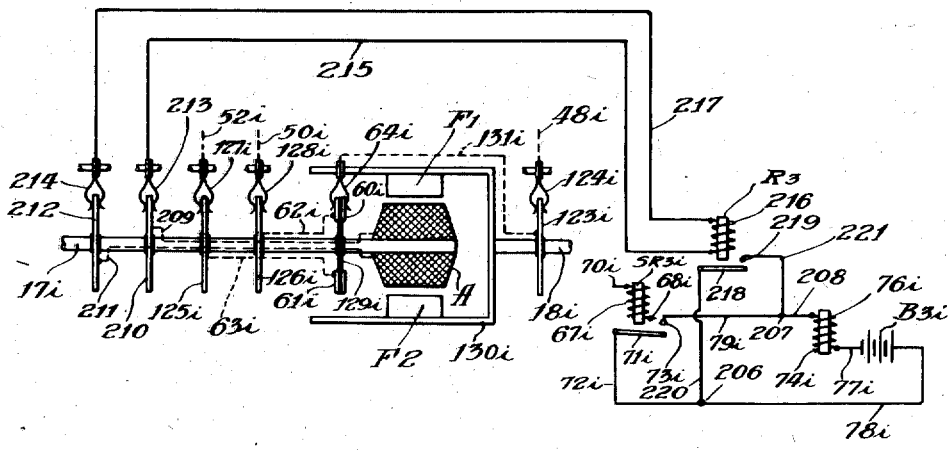
Figure 12:
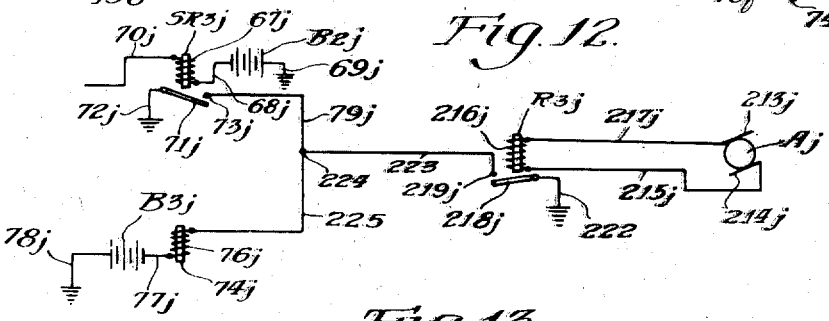

In Figs. 9 and 12 I have illustrated arrangements wherein switches such as those which have been thus far described may be supplemented by means for generating an electromotive force upon relative rotation of wheels of railway equipment or the like, such as the relative rotation between such wheels as causes operation of the switches described above.

Thus in Fig. 9 I show shafts 17*i* and 18*i*. A bracket 130*i* is provided on the shaft 18*i* and carries field pieces F1 and F2, and an armature A is fast on the shaft 17*i* for cooperation with the field pieces F1 and F2. In Fig. 12 I have diagrammatically illustrated an armature A*j* and brushes 213*j* and 214*j*. It will be apparent that upon rotation of the shafts 17*i* and 18*i* relative to each other that the field pieces F1 and F2 will rotate relative to the armature A whereupon electromotive force will be set up in the armature A. Upon similar relative movement between the armature A*j* and field pieces corresponding to the field pieces F1 and F2, Fig. 9, an electromotive force will be generated in the armature A*j*.

Referring first to the form of the invention shown in Ftg. 9, a switch similar to that shown in Fig. 8 is employed, said switch comprising the plate 129*i* of insulating material on which contact strips 60*i* and 61*i* similar to the contact strips 60*d* and 61*d*, Fig. 8, are provided to be successively engaged with the spring contact 64*i*. Then in the manner described with reference to Fig. 8, circuit is alternately closed from the conductor 48*i* to the conductors 50*i* or 52*i*.

Either in the manner disclosed in Fig. 8 or in any other suitable way, the conductors 48*i*, 50*i* and 52*i* will be connected in circuit with devices which will bring about operation of a slow-to-relase relay SR3*i*, the slow-to-release relay SR3*i*, for example, corresponding to the slow-to-release relay SR3*d*, Fig. 8. To further illustrate how the slow-to-release relay SR3*i* could be placed under control of circuits of which the conductors 48*i*, 50*i* and 52*i* are a part, conductors 70*i* and 68*i* are shown connected to opposite ends of the winding 67*i* of the slow-to-release relay SR3*i*. Such conductors 70*i* and 68*i* could lead respectively to terminals as 94*d* and 205, Fig. 8.

When circuit is closed through the winding 67i to energize the slow-to-release relay SR3*i* the armature 71i is attracted into engagement with the contact 73i whereupon circuit is closed from a source of current as the battery B3*i* through conductor 78i, terminal 206, conductor 72i, armature 71i, contact 73i, conductor 79i, terminal 207, conductor 208, winding 76i and conductor 77i back to the battery B3*i* whereupon the solenoid 74i of which the winding 76i is a part is rendered operative to bring about a control operation such as, for example, that brought about upon energization of the solenoid 74d described above.

It will be recognized that energization of the slow-to-release relay SR3*i* is brought about by rotation of the shafts 17i and 18i relative to each other, for example, as relative rotation of the shafts 17d and 18d, Fig. 8, brings about energization of the slow-to-release relay SR3*d*. When such relative rotation between the shafts 17i and 18i occurs there is relative rotation between the field pieces F1 and F2 and the armature A whereupon an electromotive force is set up in the armature A. A conductor 209 leads from one end of the winding of the armature A to a conductor disc 210 mounted on, but insulated from, the shaft 17i while another conductor 211 leads from the other end of said winding to a conductive disc 212 mounted on, but insulated from, the shaft 17i. A stationary spring contact 213 bears on the disc 210 and another stationary spring contact 214 bears on the disc 212. A conductor 215 leads from the spring contact 213 to one end of the winding 216 of a relay R3 while a conductor 217 leads from the other end of the winding 216 to the spring contact 214.

Thus an electromotive force set up in the armature A is impressed on the winding 216 and when this electromotive force is of sufficient magnitude, which would be directly proportionate to the magnitude of the relative rotation between the shafts 17i and 18i, relay R3 is energized whereupon the armature 218 thereof is attracted into engagement with the contact 219 and thereupon circuit is closed from the source of current as the battery B3*i* through conductor 78i, terminal 206, conductor 220, armature 218, contact 219, conductor 221, terminal 207, conductor 208, winding 76i, conductor 77i, and back to the battery B3*i* which affords another source of energization for the solenoid 74i.

It will be apparent, so long as the relative rotation between the shafts 17i and 18i is great enough to generate an electromotive force sufficient to effect operation of the relay R3 that circuit will be closed through the winding 76i wherefore the solenoid 74i will be maintained operative for the purpose above described.

The arrangement including the relay R3 need not be, but could be, as sensitive, or even more sensitive, than that including the slow-to-release relay SR3*i* but preferably is not as sensitive so that once the relay R3 is rendered operative it will bring about and maintain a control operation, such as is brought about by operation of the solenoid 74i, so long as an abnormal condition, indicated by rotation of the shafts 17i and 18i relative to each other, is prevalent. Of course, when the relative rotation between the shafts 17i and 18i is so reduced that the electromotive force set up is not sufficient to maintain the relay R3 energized, the relay releases and the stick circuit for the winding 76i closed by engagement of the armature 218 with the contact 219 will be broken. Either before or after this, depending upon conditions, the slow-to-release relay SR3*i* will release freeing the armature 71i from the contact 73i whereupon the circuit closed by engagement of said armature with said contact is opened. If desired, a slow-to-release relay could be used in place of the relay R3.

From the foregoing it will be apparent that the arrangement shown in Fig. 9 is such that a dual source of energization for the winding 76i of the solenoid 74i is provided and hence if one or the other of the means controlling this dual source of energization should fail to operate as intended the other may be relied upon to bring about a control operation.

In Fig. 12 a modification of the arrangement shown in Fig. 9 is illustrated and herein a conductor 217j leads from the brush 213j to one end of the winding 216j of the relay R3*j* while a conductor 215j leads from the other end of this winding to the brush 214j.

It will be understood that the field pieces of the generator shown in Fig. 12 are arranged for rotation at a speed proportionate to the rate of rotation of a wheel of railway equipment or the like while the armature A*j* is arranged for rotation at a rate proportionate to another such wheel and that when the relative rotation between these field pieces and the armature A*j* is sufficient to generate an electromotive force that will cause operation of the relay R3*j*, the armature 218j of this relay is attracted into engagement with the contact 219j. Thereupon circuit is closed from ground at 222 through armature 218j, contact 219j, conductor 223, terminal 224 and conductor 225 and through winding 76j and conductor 77j to the source of current as the battery B3*j* which is grounded as indicated at 78j. The winding 76j is part of a solenoid 74j similar, for example, to the solenoid 74f. The winding 76j has another source of energization which is from ground at 72j through armature 71j when it is engaged with contact 73j and thence through conductor 79j, terminal 224, conductor 225 and circuit is thereupon closed through winding 76j, conductor 77j, battery B3*j* to ground at 78j.

The armature 71j is part of a slow-to-release relay SR3*j*, the winding 67j of which is energized from ground at 69j through a source of current as the battery B2*j* and conductor 68j, which is connected to one end of the winding 67j. A conductor 70j is connected to the other end of the winding 67j and may, for example, be led to a suitable point such as the contact 36a, Fig. 5, so that when a ground connection is made to the contact as 36a in the manner described hereinabove the relay SR3*j* will be energized.

As in the case of the arrangement shown in Fig. 9, the means for generating an electromotive force is intended to supplement the action of a switch which would cause ground to be applied on the winding 67j when an abnormal condition such as predetermined relative rotation between the wheels of railway equipment exists. The two sources of energization for the winding 76j of the solenoid 74j can be used to supplement each other but of course one or the other of such sources of energization could be used alone if so desired.

There may be instances where it will be desirable to render devices under control of switches as S inoperative as where on railway equipment it is desired to make an emergency stop in such circumstances that it is immaterial whether or not the wheels of the railway equipment may slide. It will be apparent from the foregoing description that devices such as those which are under control of the switches as S, or means for generating an electromotive force such as shown in Figs. 9 and 12, will be provided on each piece of railway equipment and preferably in association with each set of wheels on such equipment. Assuming therefore that each piece of railway equipment, diagrammatically illustrated in Fig. 14 and indicated by C, has two sets of wheels thereon, a switch as the switch S, Fig. 2 or the like will be arranged to be responsive to each set of wheels. Such switches are diagrammatically shown in Fig. 14 and are indicated by S.

In this instance means under control of the switches S or the like are shown enclosed in housings H. Combined vent and check valves under control of solenoids as 74*k* are provided although of course separate vent and check valves as 29 and 30, Fig. 1, could be utilized. In the present instance I have diagrammatically illustrated in Fig. 14 solenoids 74*k* for combined vent and check valves, circuits to the windings 76*k* of which are closed through conductors 77*k* and 79*k* which, for example, could respectively lead to contacts as 73*d* and terminals as 205, Fig. 8.

If such an arrangement were used each time a switch S is operated in the manner hereinabove described upon predetermined relative rotation between the wheels of the set with which the switch S is associated the combined vent and check valve associated with the solenoid 74*k* under control of the particular switch would be operated or, of course, other control operation could be effected.

In order to place all of such a plurality of switches S under a common control, a common source of current such as the battery B7, Fig. 14 is provided. A conductor 226 extends from one terminal of this battery and conductors 42*k*, similar to the hereinabove described conductors 42 both with and without suffixes, are connected to this conductor 226. Likewise conductors 48*k*, similar to the conductors 48 both with and without suffixes as described herein, are connected to a conductor 227. The conductor 227 leads to a terminal 228 in the main switch M which includes a blade 229 to which is connected a conductor 230 that leads to the other terminal of a source of current as the battery B7.

So long as the blade 229 of the switch M is engaged with the contact 228 circuit is closed to the conductors 48*k* and 42*k* and, in the manner above described, upon operation of the switches S, when an abnormal condition exists, circuits are closed to the solenoids 74*k*. When however it is desired to render the switches S ineffective, the blade 229 of the main switch M is disengaged from the contact 228 whereupon the conductors 48*k* are disconnected from the source of current. In such an instance whether or not the switches S tended to close circuit from the conductors as 48k to conductors as 50*k* and 52*k* a control operation would not be initiated since the conductors 48*k* are disconnected from battery. The main switch M is preferably located at a convenient point, desirably to be under control of the operator of the brakes of the railway equipment and to this end the switch would be provided in the locomotive operating the cars as C, such locomotive being diagrammatically illustrated in Fig. 14 and being indicated by D.

Thus far I have described slow-to-release relays as being used to interpose a time factor in the operation of my novel control apparatus. It is to be understood, however, that a wide variety of devices might be used in place of slow-to-release relays and, as an example of other devices embodying a time factor in their operation and which might be used in my apparatus, I have shown, in Fig. 14A, three dash pots 231, 232 and 233 as being substituted for the slow-to-release relays SR1*b*, SR2*b* and SR3*b*, respectively, illustrated in Fig. 6.

Each of these dash pots as 231 includes a cylinder 234, a piston 235, a spring 236, normally urging the piston outwardly of the cylinder, and a plunger 237 which is preferably the core of a solenoid and which is connected to the piston. An arm 238 pivotally mounted as indicated at 239 exteriorly of the cylinder extends through an opening 240 in the wall of the cylinder and when the piston 235 is in its inoperative position it is forced against this arm by the spring 236 and engagement of the arm with the edge of the opening 240 therefore limits outward movement of the piston in the cylinder.

A relatively enlarged opening 241 is provided in the piston 235 and is normally covered by a flap valve 242 which has a relative restricted orifice 243 therein communicating with the opening 241. When the winding 47*m*, of the solenoid of which the core 237 is a part, is energized, the core or plunger 237 is forced in the direction of the piston 235 whereupon the piston is forced inwardly of the cylinder 234. During such inward movement of the piston the flap valve 242 is force from its normal position with respect to the opening 241 whereupon the piston may be forced inwardly of the cylinder 234 rather rapidly. However, when circuit to the winding 47*m* is broken the spring 236 becomes effective to force the piston 235 outwardly of the cylinder 234. During such outward movement of the piston the flap valve 242 seats over the opening 241 and in the present instance air (it will of course be understood that it could be any suitable fluid) is admitted through the relatively restricted orifice 243 and opening 241 to the area interiorly of the cylinder and below the piston rather slowly and as a result the piston 235 is slowly forced outwardly. This slow outward movement of the piston affords a time factor comparable to the release time of a slow-to-release relay.

Whenever the piston 235 moves from its normally inoperative position inwardly of the cylinder 234, a spring 244 acting on the arm 238 pivots this arm toward the pivotally mounted contact 37*m*, a block of insulating material 245 being interposed between the arm 238 and the movable contact 37*m*. Such movement of the arm 238 engages the contact 37*m* with the fixed contact 36*m*. Of course, when the piston 235 returns to its normal inoperative position, it so moves the arm 238 that the movable contact 37*m* is disengaged from the fixed contact 36*m*.

The dash pots 232 and 233 are similar to the dash pot 231, inward movement of the piston of the dash pot 232 causing engagement of the movable contact 40*m* with the fixed contact 39*m*, such inward movement of this piston resulting from energization of the winding 45*m*, and likewise energization of the winding 67*m* causes inward movement of the piston of the dash pot 233 to cause engagement of the movable contact 71*m* with the fixed contact 73*m*. Contrawise, the normal inoperative positions of these pistons disengages the constacts 40*m* and 71*m*, respectively, from the contacts 39*m* and 73*m*.

Figure 2:
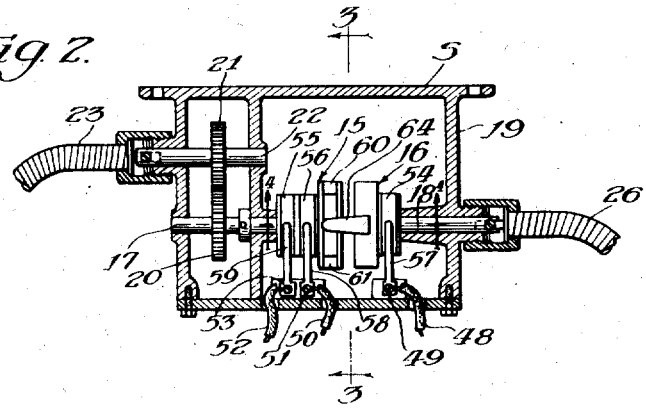
Fig. 2 is a vertical sectional view of a switching means employed in the embodiment of my invention illustrated in Fig. 1.
Figure 3:
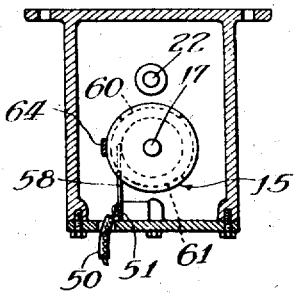
Fig. 3 is a transverse sectional view taken substantially on the line 3—3 on Fig. 2.
Figure 4:
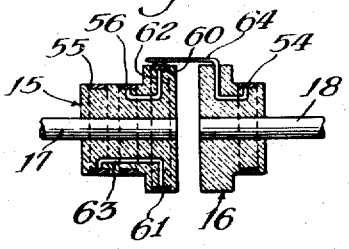
Fig. 4 is a sectional detail view taken substantially on the line 4—4 on Fig. 2.

The form of my invention shown in Fig. 14A operates similarly to the form of my invention shown in Fig. 6, which is to say, through a suitable switch such as the switch S, Fig. 2, or an equivalent switch, circuit is alternately closed from battery B1*m* and conductor 48*m* to conductor 50*m* or conductor 52*m*. The conductor 50*m* leads to a terminal 87*m* while the conductor 52*m* leads to a terminal 88*m* and when circuit is closed to these conductors it is also closed to these terminals.

It will be understood that so long as the dash pots 231, 232 and 233 are operative, that is so long as the pistons of these dash pots are out of the normally inoperative position thereof illustrated in Fig. 14A, that the movable contacts 37*m*, 40*m* and 71*m* are respectively engaged with the fixed contacts 36*m*, 39*m* and 73*m*.

When circuit is closed in the manner hereinabove described to the terminal 87*m*, circuit is also closed through conductor 89*m*, winding 47*m*, and conductors 44*m* and 42*m* back to the source of current B1*m* whereupon winding 47*m* is energized and the piston of the dash pot 231 is forced inwardly and movable contact 37*m* engages fixed contact 36*m*. Such engagement of contacts 36*m* and 37*m* does not necessarily close circuit to the winding 67*m*, since circuit to conductor 52*m* and terminal 88*m* is not closed at the same time that circuit is closed to conductor 50*m* and terminal 87*m*, and in normal operation circuit will have been broken to the conductor 50*m* and the winding 47*m* will have been deenergized to thereby disengage the contacts 36*m* and 37*m* prior to the time circuit is closed to conductor 52*m*.

When circuit is closed to conductor 52*m* it is also closed to terminal 88*m* and in normal operation as explained above, this does not close circuit through conductor 132*m*, movable contact 37*m*, fixed contact 36*m* and conductor 93*m* to terminal 94*m* for at this time contact 37*m* will be disengaged from contact 36*m*.

However, closing of circuit to conductor 52*m* also closes circuit to conductor 92*m* and through winding 45*m* and conductors 46*m*, 90*m* and 42*m* back to the source of current B1*m* whereupon the piston of dash pot 232 is forced from its normally inoperative position and movable contact 40*m* engages fixed contact 39*m*. However, since in normal operation circuit will not be closed to terminal 87*m* at the time contact 40*m* engages contact 39*m*, circuit is again not closed, in normal operation, to terminal 94*m* in this instance.

When, however, circuit is closed to conductor 52*m* and terminal 88*m* prior to the time movable contact 37*m* has disengaged contact 36*m*, which engagement was brought about by the closing of circuit to terminal 87*m*, then circuit is closed from terminal 88*m* through conductor 132*m*, contact 37*m*, contact 36*m* and conductor 93*m* to terminal 94*m*. At this same time the winding 45*m* will be energized and movable contact 40*m* will be engaged with fixed contact 39*m*. If, therefore, circuit is closed to conductor 50*m* and terminal 87*m* prior to the time contact 40*m* disengages contact 39*m*, circuit will be closed to terminal 94*m* from terminal 87*m* through conductor 95*m*, contact 40*m*, contact 39*m* and conductor 96*m*.

When circuit is closed to terminal 94*m* from either of the sources above described, circuit is closed through conductor 70*m*, winding 67*m* and through conductors 68*m*, 135*m*, 90*m* and 42*m* back to the source of current B1*m* whereupon winding 67*m* is energized and movable contact 71*m* is engaged with fixed contact 73*m*. The engagement of these contacts closes circuit from conductor 72*m*, which may be led to a terminal, similar to the terminal 133, Fig. 8, in the conductor 48*m*, through contacts 71*m* and 73*m* and conductor 77*m* to winding 76*m*, the circuit being completed through the conductors 79*m*, 135*m*, 90*m* and 42*m* back to the source of current B1*m*. Closing of circuit in this manner energizes the winding 76*m* and thereupon renders the solenoid 74*m* operative, the solenoid 74*m* corresponding to, for example, the solenoid 74*b*, Fig. 6, to bring about a control operation as above described. In such instance the dash pot 233 will operate similarly to the slow-to-release relay SR3*b* to bring about a control operation for at least a predetermined time, such time being dependent upon the time required for the piston of the dash pot 233 to return to its normal inoperative position which, as explained heretofore, results in separation of movable contact 71*m* from fixed contact 73*m*.

It will be seen from the foregoing description that devices other than slow-to-release relays may be employed but in any event it is important to employ a device which embodies a time factor in its operation so that whenever the force rendering the device operative is interrupted as, for example, when an energizing circuit therefor is broken, the device will remain operative for at least a predetermined period. Furthermore, devices similar to the herein described dash pots or other equivalent means, but having a time lag interposed in their operative cycle in what might be called their energizing rather than their releasing phase, as do the described dash pots, might be used in place of the slow-to-release relays described herein.

It will be understood from the foregoing description that the switch shown in Fig. 2 could be substituted for the switches shown in Figs. 8, 9, 10, 11 and 13A or that any one of the switches shown in these last-named views could be substituted for each other or the switch shown in Fig. 2. Furthermore, an arrangement such as the clutches 82 and 83, Fig. 5, could be associated with any of the illustrated switches so that the relatively movable parts of the switches would not be driven except at a time when the need for a control operation might arise, such as, for example, during a braking operation on railway equipment when wheel slippage might occur.

It will be recognized that the arrangements shown in Figs. 11 and 13 avoid relative rotation between switch parts through which an electric circuit is closed, and that the arrangement shown in Fig. 10 insures positive engagement of the brush with the contact strips. Furthermore, the switches such as are shown in Figs. 11 and 13 could be arranged to cause contact closure through one hundred eighty degrees of relative rotation rather than through ninety degrees of relative rotation as is effected in switches such as shown in Fig. 2.

It is also to be understood that a switch such as the switch 80, Fig. 5, could be provided in the various arrangements illustrated so as to prevent energization of the relays or the like in the various circuits except during those times when the need for a control operation might arise, the disposition of the switch 80 as shown in Fig. 5 being typical of such an arrangement.

It will be apparent that the provision of a slow-to-release relay such as the slow-to-release relay SR3, Fig. 5, will cause a control operation to be effected for at least a predetermined period and that this arrangement avoids a fluttering condition such as might arise in the use of an arrangement such as shown in Fig. 1 as hereinabove explained.

It is also to be understood that visible signals, such as the lamp L, Fig. 7, or audible signals, such as the buzzer N, Fig. 7, could be associated with each of the various arrangements illustrated to indicate that a control operation is in progress. It will be recognized that either or both of such signals could be employed and that such signals could be located near the main switch M, Fig. 14, is so desired.

It will likewise be apparent that the provision of a slow-to-energize relay as SE1, Fig. 7, affords a safety factor for, if a control operation should not be effected in the manner intended, such a relay could be arranged, as is the relay SE1, to prevent a further control operation being effected until the devices effectuating the control operation had been manually rendered operative as by separating a movable contact as 109 from a fixed contact as 108.

It is also to be understood that while I have, in most instances, shown and described two slow-to-release relays for controlling operation of the means which bring about a control operation, comparable results could be obtained by employing but one slow-to-release relay. For example, either the relay SR1 or the relay SR2, Fig. 1, could be a slow-to-release relay while some other suitable relay, not slow-to-release, could be substituted for the other. In such an instance circuit would be closed to the coils 31 and 33 only when such other relay was rendered operative at a time the slow-to-release relay remained operative. This would also be true if only the relay SR1*a* or the relay SR2*a*, Fig. 5, were a slow-to-release relay, in which instance relay SR3 would be rendered operative under the circumstances described above and circuit would be closed to windings 31 and 33 as described hereinabove. The foregoing explanation illustrates how only one slow-to-release relay could be used in the various arrangements shown and described herein, it being remembered that only one such relay need be utilized in the arrangement shown in Fig. 13.

It will also be understood that by providing additional rotors, such as the rotors 15 and 16, or the like, in the switch S or other of the switches, or equivalent means, and by duplicating devices described herein, or providing equivalents thereof, in association with such additional rotors or the like that my novel apparatus could be rendered responsive to predetermined relative movement among more than two relatively movable elements, and hence it will be recognized that while I have described my device as being responsive to predetermined relative movement between two movable elements (especially two associated wheels of railway equipment) that it is capable of much wider application.

My invention has been described with particular reference to preventing wheel sliding in event of slippage of a wheel of railway equipment on the rail on which it normally rolls. However, it is to be understood that my invention is susceptible of use to bring about a control operation wherever parts capable of movement relative to each other are provided.

Furthermore, in describing my invention I have referred to releasing the breaking means effective to decelerate wheels with which my apparatus is used and I have also referred to reducing the effectiveness of such braking means in the sense that the braking means are not entirely released but it will be appreciated that the effect is the same in either instance for if the braking means are released they are, by that fact, reduced in effectiveness, which is to say, reduced in retarding effect.

I have herein illustrated a variety of embodiments of my invention and it will be noted that the feature common to the various arrangements is the utilization of at least one slow-to-release relay or equivalent device embodying a time factor in its operation. It is therefore to be understood that the disclosure herein of various embodiments of my invention is by no means exhaustive for the primary features underlying my invention are susceptible of use in many other arrangements.

Hence while I have illustrated and described selected embodiments of my invention it is to be understood that these are capable of variation and modification and I therefore do not wish to be limited to the precise details set forth but desire to avail myself of such changes and alterations as fall within the scope of the following claims.

I claim:

1. An apparatus for detecting undesired variation beyond a predetermined range of variation from a desired speed relation among at least two moving elements, said apparatus including members each adapted to be driven from a different one of said elements and adapted to move relatively upon variation from the desired speed relation among said elements, said members including means operable to produce a series of control impulses upon relative movement among said members at a frequency proportionate to the rate of such relative movement, and means under control of means included in said members and constituted and arranged to produce a governing impulse only when the rate of relative movement among said members and therefore the variation from the desired speed relation among said elements exceeds a predetermined rate greater than zero.

2. An apparatus for detecting changes in rotative speed of at least one of a plurality of rotative elements at a rate in excess of a certain rate, said apparatus including members each driven from a different one of the rotative elements, means operable by said members upon a change in the rotative speed relation of said elements to produce a series of control impulses at a frequency proportionate to the rate of change in speed relation, and means responsive only to such frequencies of said control impulses as are produced when the rate of change in speed relation is in excess of a certain rate greater than zero and operative in such an instance to produce a governing impulse.

3. In a device for ascertaining the need for a control operation in response to an undesired variation in a predetermined desired speed relation of a pair of moving elements, the combination of a pair of movable members adapted to be driven one by each of said elements, a pair of electrical circuits, switch means associated with said movable members and operable upon variation of said elements from said desired speed relation to close said electrical circuits alternately at intervals which are reduced as said variation from said desired speed relation increases, each of said circuits including a relay and at least one of said relays being of the slow-to-release type, and a control circuit including the switches of said relays in series.

4. In a device for ascertaining the need for a control operation to correct an undesired variation in a predetermined speed relation of a pair of moving elements, the combination of a pair of movable members adapted to be driven one by each of said elements, electrical circuit means, switch means associated with said movable members and operable upon variation of said elements from said desired speed relation to close said electrical circuit means at intervals which vary in a predetermined time relation as said variation from said desired speed relation increases, said circuit means including relay means of the slow-to-release type, and a control circuit governed by said relay means.

5. An apparatus for detecting an undesired range of variation from a predetermined desired speed relation in two moving elements, said apparatus comprising a pair of members one adapted to be driven from each of said elements, a pair of circuits each including switch means associated with said members, said members being operable as an incident to relative movement of said members to close said switches alternately at a rate varying with the speed of such relative movement, a first slow-to-release relay having its actuating coil in one of said circuits, a second slow-to-release relay having its actuating coil in the other of said circuits, a final control relay having an actuating coil, and circuit means including parallel shunt circuits controlled respectively by said first and second relays and operable when the contacts of either one of said first or second relays are closed to place said final control relay in circuit with and under the control of the switch means which governs the other or open one of said first and second relays.

6. In a detecting and governing apparatus for governing a control operation effecting means, at least two devices for controlling operation of the control operation effecting means, means for rendering said devices operative successively, at least one of said devices having a sustained operative period after the means rendering the device operative has ceased to be effective thereon, and means operable to render such a control operation effecting means operative when another of the devices is rendered operative during such a sustained operative period.

7. In an apparatus for association with means for effecting a control operation, electrical means for operating such a control operation effecting means, at least two relays having relay contacts for controlling current flow to said electrical means, means for energizing said relays successively, at least one of said relays being a slow-to-release relay, and energizing circuit means including said relay contacts and through which current flow to said electrical means is controlled by said relays to bring about operation of the control operation effecting means when at least one other of said relays is energized at a time when a slow-to-release relay remains operative.

8. In an apparatus as claimed in claim 7, means for maintaining the control operation effecting means operative for at least a predetermined period of time once such control operation effecting means has been rendered operative, and means for rendering the control operation effecting means unresponsive to the relays when such means are maintained operative for longer than said predetermined period of time.

9. In an apparatus as claimed in claim 7, a slow-to-release relay in the circuit means for maintaining the control operation effecting means operative for at least a predetermined period of time once such means has been rendered operative, and a slow-to-energize relay connected in and energized by the circuit means for rendering the control operation effecting means unresponsive to the relays when such control operation effecting means are maintained operative for longer than said predetermined period of time.

10. In an apparatus as claimed in claim 7, a slow-to-release relay in the circuit means for maintaining the control operation effecting means operative for at least a predetermined period of time once such means has been rendered operative, a slow-to-energize relay in the circuit means for rendering the control operation effecting means unresponsive to the relays when such control operation effecting means are maintained operative for longer than said predetermined period of time, and means for maintaining the slow-to-energize relay energized once it is energized and including a manually operable switch, the last-named means maintaining the slow-to-energize relay energized until said switch is manually operated.

11. In an apparatus as claimed in claim 7, a slow-to-energize relay in the circuit means for rendering the control operation effecting means unresponsive to the relays when such control operation effecting means are maintained operative for longer than said predetermined period of time, and means for indicating that the control operation effecting means is being thus maintained unresponsive.

12. In an apparatus which includes means for effecting a control operation under control of relative movement between at least two movable elements, detecting means including at least two parts adapted to be driven respectively at speeds proportionate to the speeds of the respective elements, at least two electrically operated devices for rendering the control operation effecting means operative when the devices are operative simultaneously, spaced contact means on one of said parts, second contact means on another of said parts, circuit means interconnecting said electrically-operated devices and contact means and through which at least one of said devices is energized to be rendered operative when the second contact means engages one of the spaced contact means and through which at least one other of the devices is energized to be rendered operative when the second contact means engages another of the spaced contact means, at least one of said devices remaining operative for a predetermined period of time after the second contact means has disengaged the spaced contact means engaged thereby to effect energization of said device whereby the devices are operative simultaneously to effect operation of the control operation effecting means when the relative movement between said parts of the detecting means is such that the second contact means moves from engagement with the spaced contact means, that is engaged thereby to render operative a device which remains operative for a predetermined period of time as aforesaid, and moves into engagement with another spaced contact means to render another of said devices operative in a period of time less than said predetermined period of time.

13. In an apparatus for detecting the need for a control operation under control of relative movement between at least two movable elements, electrical governing means for governing the desired control operation, at least two relays for effecting current flow to said electrical means when the relays are operative simultaneously, and circuit closing means adapted to be operated under control of the movement of said elements for rendering said relays operative successively upon relative movement between said elements, at least one of said relays being a slow-to-release relay whereby the relays are operative simultaneously to effect operation of the control operation effecting means when the relative movement between the elements is such that the circuit closing means renders at least one other of said relays operative at a time when a slow-to-release relay remains operative.

14. In an apparatus as claimed in claim 13, means for maintaining the control operation effecting means operative for at least a predetermined period of time once such control operation effecting means has been rendered operative.

15. In an apparatus as claimed in claim 13, means for maintaining the control operation effecting means operative for at least a predetermined period of time once such means has been rendered operative, and means for rendering the control operation effecting means unresponsive to the relays when such control operation effecting means are maintained operative for longer than said predetermined period of time.

16. In an apparatus as claimed in claim 13, a slow-to-release relay in the circuit means for maintaining the control operation effecting means operative for at least a predetermined period of time once such control operation effecting means has been rendered operative, a slow-to-energize relay in the circuit means for rendering the control operation effecting means unresponsive to the relays when such means are maintained operative for longer than said predetermined period of time, and means for maintaining the slow-to-energize relay energized once it is energized and including a manually operable switch, the last-named means maintaining the slow-to-energize relay energized until said switch is manually operated.

17. In an apparatus which includes means for effecting a control operation under control of relative movement between at least two movable elements, electrical means for operating the control operation effecting means, detecting means including at least two parts respectively movable at speeds proportionate to the speeds of the respective elements, at least two relays for effecting current flow to said electrical means when the relays are operative simultaneously, spaced contact means on one of said parts, second contact means on another of said parts, circuit means interconnecting said relays and said contact means and through which at least one of said relays is energized to be rendered operative when the second contact means engages one of the spaced contact means and through which at least one other of the relays is energized to be rendered operative when the second contact means engages another of the spaced contact means, at least one of said relays being a slow-to-release relay whereby the relays are operative simultaneously to effect operation of the control operation effecting means when the relative movement between said parts of the detecting means is such that the second contact means moves from engagement with the spaced contact means, that is engaged thereby to render a slow-to-release relay operative, and moves into engagement with another of the spaced contact means to render another of said relays operative in a period of time less than the release time of the previously energized slow-to-release relay.

18. In an apparatus for use with at least two elements capable of movement relative to each other, directing means including parts respectively movable with the respective elements, control means, control devices interposed between the detecting means and the control means and adapted to effect operation of the control means when at least two devices are operative simultaneously, said parts having sections thereon selectively adapted for cooperation with each other upon movement of the parts relative to each other when there is relative movement between the elements, said devices each being respectively connected with selected of the sections to be rendered operative for so long as its associated section cooperates with other of the sections whereby the devices are rendered operative successively upon relative movement of the parts, at least one of said devices remaining operative for a predetermined time after interruption of the cooperation between its associated section and another section whereby at least two of said devices are brought into simultaneous operation to render said control means operative when the relative movement between said parts causes one of said devices to be rendered operative when a device is remaining operative for a predetermined time as aforesaid.

19. In an apparatus for use with at least two elements capable of movement relative to each other, detecting means including parts respectively movable with the respective elements, electrically-operated control means, at least two relays, the contacts of the various relays being connected in a series circuit including said control means whereby when the contacts of the various relays are closed simultaneously circuit is closed to said control means to render it operative, said parts having contact means thereon and said relays being respectively in circuit with selected of the contact means, said contact means being selectively adapted for cooperation with each other upon movement of the parts relative to each other when there is relative movement between the elements, each of said relays being energized for so long as its associated contact means cooperates with another of the contact means upon relative movement of the parts whereby the relays are energized successively to close the contacts thereof, at least one of said relays being a slow-to-release relay whereby the contacts thereof remain closed after the energizing circuit thereto is interrupted by disengagement of its associated contact means from another of the contact means so that at least two of said relays are operative simultaneously to close the contacts associated therewith to thereby close circuit to the control means when the relative movement between said parts causes one of the relays to be energized and rendered operative during the release time of the slow-to-release relay.

20. In an apparatus for use with at least two elements capable of movement relative to each other, detecting means including parts respectively movable with the respective elements, a control circuit, at least two slow-to-release relays each including contacts which remain closed for a predetermined time after the energizing circuit to the relay is broken, the contacts of the various relays being connected in a series circuit including said control circuit whereby when the contacts of the various relays are closed simultaneously circuit is closed to said control circuit to render it operative, one of said parts having spaced contact strips thereon and said relays being respectively in circuit with the contact strips, another of said parts having a contact member thereon successively engageable with the contact strips upon movement of the parts relative to each other when there is relative movement between the elements, each of said relays being energized for so long as its associated contact strip is engaged by the contact member upon relative movement of the parts whereby the relays are energized successively to close the contacts thereof so that the relays are operative simultaneously to close the contacts thereof simultaneously and thereby render the control circuit operative when the relative movement between said parts causes the contact member to move from engagement with one contact strip into engagement with the other contact strip during the release time of the other of said relays.

21. An apparatus of the class described including a pair of electrically-operated devices each embodying a set of contacts closable upon operation of the device, an energizing circuit for each of said devices, an electrically-operated mechanism, a series circuit including the contacts of both sets and said mechanism and through which said mechanism is energized to be rendered operative when the contacts of both sets are closed simultaneously, at least one of said devices operating to maintain the contacts thereof closed for a predetermined period of time after the energizing circuit thereof is opened, and means operable under control of relative movement between a pair of elements to close said energizing circuits successively upon such relative movement and thereby render said devices operative to close the contacts thereof successively, said sets of contacts being closed simultaneously to render said mechanism operative when the relative movement is of such degree that the energizing circuit of one device is closed during the predetermined time the contacts of the other device remain closed after the energizing circuit to said other device is opened.

22. An apparatus of the class described including a pair of relays each embodying a set of contacts closable upon operation of the relay, at least one of said relays being a slow-to-release relay whereby the contacts thereof remain closed after the energizing circuit thereof is broken, an energizing circuit for each of said relays, a third relay, said third relay also being a slow-to-release relay, a series circuit including the contacts of both sets and said third relay and through which said third relay is energized to be rendered operative when the contacts of both sets are closed simultaneously, means operable under control of relative movement between a pair of elements to close said energizing circuits successively upon such relative movement and thereby render the relays of said pair of relays operative to close the contacts thereof successively, said sets of contacts being closed simultaneously to render the third relay operative when the relative movement is of such degree that the energizing circuit of one of the relays of said pair of relays is closed during the predetermined time the contacts of the slow-to-release of said relays remain closed after the energizing circuit to said slow-to-release relay is opened, said third relay including a set of contacts closable upon operation thereof and adapted to remain closed for a predetermined time after the energizing circuit to said third relay is broken, an electrically- operated control mechanism, and circuit means including the set of contacts of said third relay and said control mechanism and operable upon closure of the set of contacts of the said third relay to render said mechanism operative, said mechanism remaining operative for at least a predetermined time each time said third relay is energized.

23. An apparatus of the class described including a pair of electrically-operated devices, at least one of said devices embodying contacts engageable upon operation of the device, a third electrically-operated device also including contacts engageable upon operation of the device, an energizing circuit for each device of said pair of devices, the energizing circuit for at least one of said devices including a branch circuit in which the contacts of another of said devices and said third device are included, each device including contacts having a slow-to-release action so as to operate to maintain the contacts thereof closed for a predetermined period of time after the energizing circuit thereof is opened, means under control of relative movement between a pair of elements to close said energizing circuit successively upon such relative movement and thereby render the devices of said pair of devices operative to close the contacts thereof successively, whereby when the relative movement is of such degree that an energizing circuit including a branch circuit renders the device in circuit therewith operative during the time the contacts of a slow-to-release device of another energized circuit are closed, circuit is closed to said third device to render it operative, and means for effecting a control operation and which are rendered operative under control of the contacts of said third device for at least a predetermined period of time each time said third device is rendered operative.

24. In an apparatus as claimed in claim 23, a slow-to-energize relay in the circuit between the means for effecting a control operation and the contacts of the third device and to which circuit is closed upon engagement of the contacts of said third device, and said slow-to-energize relay including contacts in the circuit between the means for effecting a control operation and the contacts of said third device and which contacts are adapted to disengage to open the circuit to said means for effecting a control operation when circuit to said slow-to-energize relay is maintained closed for longer than a predetermined time.

25. In an apparatus as claimed in claim 23, a slow-to-energize relay in the circuit between the means for effecting a control operation and the contacts of the third device and to which circuit is closed upon engagement of the contacts of said third device, said slow-to-energize relay including contacts in the circuit between the means for effecting a control operation and the contacts of said third device and which contacts are adapted to disengage to open the circuit to said means for effecting a control operation when circuit to said slow-to-energize relay is maintained closed for longer than a predetermined time, and manually-operable means for maintaining said slow-to-energize relay operative once it has been rendered operative to thereby maintain the means for effecting a control operation inoperative until said manually-operable means are operated to deenergize said slow-to-energize relay.

26. In an apparatus as claimed in claim 23, a slow-to-energize relay in the circuit between the means for effecting a control operation and the contacts of the third device and to which circuit is closed upon engagement of the contacts of said third device, said slow-to-energize relay including contacts in the circuit between the means for effecting a control operation and the contacts of said third device and which contacts are adapted to disengage to open the circuit to said means for effecting a control operation when circuit to said slow-to-energize relay is maintained closed for longer than a predetermined time, manually-operable means for maintaining said slow-to-energize relay operative once it has been rendered operative to thereby maintain the means for effecting a control operation inoperative until said manually-operable means are operated to deenergize said slow-to-energize relay, and means for indicating that said slow-to-energize relay has been rendered operative.

27. An apparatus of the class described including a pair of relays, at least one of said relays embodying contacts closable upon operation of the relay, a third relay also including contacts closable upon operation of the relay, an energizing circuit for each relay of said pair of relays, the energizing circuit for at least one of said relays including a branch circuit in which the contacts on another of said relays and said third relay are included, each relay including contacts being a slow-to-release relay whereby the contacts thereof remain closed for a predetermined period of time after the energizing circuit thereof is opened, means under control of relative movement between a pair of elements to close said energizing circuits successively upon such relative movement and thereby render the relays of said pair of relays operative to close the contacts thereof successively whereby when the relative movement is of such degree that an energizing circuit including a branch circuit renders the relay in circuit therewith operative, during the time the contacts of the other slow-to-release relay of said pair remain closed after the energizing circuit to such other relay is opened, the circuit is closed to said third relay to render it operative, and means for effecting a control operation and which are rendered operative under control of the contacts of said third relay for at least a predetermined period of time each time said third relay is rendered operative.

28. In an apparatus which comprises a plurality of mechanisms each embodying a means for effecting a control operation under control of relative movement between at least two movable elements, detecting means including at least two parts respectively movable at speeds proportionate to the speeds of the respective elements, at least two electrically-operated devices for rendering the control operation effecting means operative when the devices are operative simultaneously, spaced contact means on one of said parts, second contact means on another of said parts, circuit means interconnecting said electrically-operated devices and contact means and through which at least one of said devices is energized to be rendered operative when the second contact means engages one of the spaced contact means and through which at least one other of the devices is energized to be rendered operative when the second contact means engages another of the spaced contact means, at least one of said devices remaining operative for a predetermined period of time after the second contact means has disengaged the spaced contact means engaged thereby to effect energization of said device whereby the devices are operative simultaneously to effect operation of the control operation effecting means when the relative movement between said parts of the detecting means is such that the second contact means moves from engagement with the spaced contact means, that is engaged thereby to render operative a device which remains operative for a predetermined period of time as aforesaid, and moves into engagement with another spaced contact means to render another of said devices operative in a period of time less than said predetermined period of time; and circuit means having the cooperating contact means on the aforesaid parts in each of said mechanisms connected in parallel therein, a source of current in said circuit means, and switch means in said circuit means operable to open circuit from said source to all of said cooperating contact means whereby all of said mechanisms may be simultaneously rendered inoperative upon operation of said switch means.

29. In an apparatus for detecting undesired changes in the rotative speed of at least one of a plurality of rotative elements, electrically-operated control means including operation-effecting means for effecting a selected operation for at least a certain period of time when said control means is rendered operative, switch means operable in response to an undesired change in the rotative speed of at least one of the plurality of rotative elements to render said control means operative, and safety governing means operable automatically when the operation-effecting means of said control means is operative for more than a predetermined time for interrupting the operation effected by said control means.

30. In an apparatus for use with a first rotatable element and a second rotatable element that provides a standard with which the rotative speed of the first rotative element may be compared, detecting means operable by said elements to detect an undesired difference in rotative speed between said elements, control means operable by said detecting means and having a sustained operating period once operation thereof is initiated and which is rendered operative by said detecting means when the undesired difference in speed between said elements is detected by said detecting means, and safety governing means operable automatically to terminate an operation effected by said control means when said control means has remained operative for more than a predetermined period of time.

31. In an apparatus for use with a pair of rotatable elements normally rotatable in a substantially predetermined relationship and capable of relative rotation, detecting means operable to detect an undesired relative rotation between said rotative elements, control means having at least a predetermined operative period once it has been rendered operative, electrical circuit means for said control means and governed by said detecting means and operable in response to detection of said undesired relative rotation to render said control means operative, and safety governing means operable automatically after said control means has operated for more than a predetermined time in excess of said predetermined operative period of said control means to interrupt an operation effected by said control means.

32. In an apparatus as claimed in claim 2, an operation-effecting means rendered operative by the governing impulse and which remains operative for at least a predetermined period of time when the means is rendered operative, and safety governing means operable automatically when the operation-effecting means is operative for more than a predetermined time for interrupting the operation effected by the operation-effecting means.

33. In an apparatus as claimed in claim 3, operation-effecting means in said control circuit and which is rendered operative for at least a predetermined period of time when the switches of said relays are closed simultaneously, and safety governing means operable automatically when the operation-effecting means is operative for more than a predetermined time for interrupting the operation effected by the operation-effecting means.

34. In an apparatus for detecting undesired changes in the rotative speed of at least one of a plurality of rotative elements, electrically-operated control means including operation-effecting means for effecting a selected operation for at least a certain period of time when operation of said control means is initiated, switch means operable in response to an undesired change in the rotative speed of at least one of the plurality of rotative elements to initiate operation of said control means, and safety governing means operable automatically when the operation-effecting means of said control means has operated for more than a predetermined time for interrupting the operation effected by said control means.

35. In an apparatus for use with a first rotatable element and a second rotatable element that provides a standard with which the rotative speed of the first rotative element may be compared, detecting means operable by said elements to detect an undesired difference in rotative speed between said elements, control means operable by said detecting means and having a sustained operating period once operation thereof is initiated and which is set into operation by said detecting means when the undesired difference in speed between said elements is detected by said detecting means, and safety governing means operable automatically to terminate an operation effected by said control means when said control means has remained in operation for more than a predetermined period of time.

36. In an apparatus for use with a pair of rotatable elements normally rotatable in a substantially predetermined relationship and capable of relative rotation, detecting means operable to detect an undesired relative rotation between said rotative elements, control means having at least a predetermined operative period once operation thereof has been initiated, electrical circuit means for said control means and governed by said detecting means and operable in response to detection of said undesired relative rotation to initiate operation of said control means, and safety governing means operable automatically after said control means has operated for more than a predetermined time in excess of said predetermined operative period of said control means to interrupt an operation effected by said control means.

ROSSER L. WILSON.